United States Patent
Khan et al.

(10) Patent No.: US 9,501,853 B2
(45) Date of Patent: Nov. 22, 2016

(54) PROVIDING IN-LINE PREVIEWS OF A SOURCE IMAGE FOR AID IN CORRECTING OCR ERRORS

(71) Applicant: Adobe Systems Incorporated, San Jose, CA (US)

(72) Inventors: Sayeed Ullah Khan, Uttar Pradesh (IN); Subrato Namata, New Delhi (IN); Uttam Dwivedi, Uttar Pradesh (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 19 days.

(21) Appl. No.: 14/593,431

(22) Filed: Jan. 9, 2015

(65) Prior Publication Data
US 2016/0203625 A1    Jul. 14, 2016

(51) Int. Cl.
| | |
|---|---|
| G06T 11/60 | (2006.01) |
| G06K 9/18 | (2006.01) |
| G06F 3/033 | (2013.01) |
| G06F 3/0485 | (2013.01) |

(52) U.S. Cl.
CPC .............. *G06T 11/60* (2013.01); *G06F 3/033* (2013.01); *G06F 3/0485* (2013.01); *G06K 9/18* (2013.01)

(58) Field of Classification Search
None
See application file for complete search history.

(56) References Cited

U.S. PATENT DOCUMENTS

| | | | | |
|---|---|---|---|---|
| 5,717,794 | A * | 2/1998 | Koga | G06K 9/033 382/177 |
| 6,453,079 | B1 * | 9/2002 | McInerny | G06K 9/033 382/311 |
| 6,768,816 | B2 * | 7/2004 | Hall, Jr. | G06K 9/033 382/229 |
| 9,256,592 | B1 * | 2/2016 | Shanmugasundaram | G06F 17/273 |
| 2003/0200505 | A1 * | 10/2003 | Evans | G06K 9/033 715/256 |
| 2007/0110339 | A1 * | 5/2007 | DeYoung | G06K 9/03 382/310 |
| 2008/0178115 | A1 * | 7/2008 | Yokota | G06F 3/0485 715/784 |
| 2010/0329555 | A1 * | 12/2010 | Chapman | G06K 9/033 382/167 |
| 2011/0280481 | A1 * | 11/2011 | Radakovic | G06K 9/033 382/177 |
| 2015/0138220 | A1 * | 5/2015 | Chapman | G06T 11/60 345/589 |
| 2015/0185833 | A1 * | 7/2015 | Shiraishi | G06F 3/0488 345/156 |
| 2015/0199314 | A1 * | 7/2015 | Ratnakar | G06F 17/2247 715/255 |
| 2015/0277728 | A1 * | 10/2015 | Kuznetsov | G06F 3/04847 715/771 |

* cited by examiner

*Primary Examiner* — Kimberly A Williams
(74) *Attorney, Agent, or Firm* — Keller Jolley Preece

(57) ABSTRACT

The present disclosure is directed toward systems and methods for assisting users in correcting OCR errors. For example, systems and methods described herein involve identifying the position of a cursor within a machine-readable document. Systems and methods described herein also involve identifying corresponding position co-ordinates in a source image, as well as, capturing an image preview from the source image based on the corresponding position co-ordinates. Systems and methods described herein may also involve providing the preview of the source image within the machine-readable document.

20 Claims, 14 Drawing Sheets

PROVIDING IN-LINE PREVIEWS OF A SOURCE IMAGE FOR AID IN CORRECTING OCR ERRORS

CROSS REFERENCE TO RELATED APPLICATIONS

N/A

BACKGROUND

1. Technical Field

One or more embodiments relate generally to editing optical character recognition errors. More specifically, one or more embodiments relate to editing optical character recognition errors using inline contextual image previews.

2. Background and Relevant Art

Optical character recognition (referred to herein as OCR) is a useful feature that allows a computing device to recognize text in an image and convert the text of the image into machine-readable text. For example, users can download, photograph, or scan books to obtain an image including text. The users can perform OCR on the image so as to recognize the text in the image, thereby allowing a user to select, copy, search, and edit the text.

Conventional OCR systems, however, frequently produce OCR errors when recognizing text. Common errors include unrecognizable or improperly converted text. OCR errors can often render converted text unusable until a user corrects the errors. Improperly converted text can occur, for instance, when an image may has a low resolution, blurred text, and/or unclear text. In another instance, conventional OCR systems may improperly convert text because the image may include uncommon characters or an underlying adjacent graphic that obscures the text. Furthermore, OCR systems can recognize illustrations in an image as text when the illustration does not actually include text.

In many instances, conventional OCR systems provide converted texts in an invisible layer superimposed on the image itself. As such, when a user selects text within the image, the user is selecting text in the hidden layer of converted text. If the text is improperly converted, however, the user may select text that is different from what appears to be selected. In other words, the user may believe he or she is selecting the text as shown in the image when the user is actually selecting the improperly converted text in the hidden layer. As such, a user may not discover OCR errors until trying to copy the improperly converted text into another document.

Alternative OCR systems, rather than providing an invisible layer with converted text, replace the text in the source image with system fonts. In this manner, the OCR system replaces the original text in the image with the recognized text using system fonts. Attempting to correct OCR errors in the recognized text, however, may be difficult, as the user cannot view the original image as the image has been replaced with system fonts. As such, the user is left to guess how to correct the text because the original source image is hidden or overwritten.

Some conventional systems provide a separate user interface to assist the user in correcting suspect text. Such separate user interfaces may provide a preview of the suspect word as shown in the source image. Under this approach, however, the user must switch back and forth between viewing the machine-readable document and the separate user interface. In transitioning back and forth, the user can easily lose track of where the suspect text is in the machine-readable document, thus, adding confusion to the correction process. Overall, the process of correcting OCR errors using separate user interfaces is often tedious and frustrating.

Thus, there are several disadvantages to current methods for correcting, editing, and reviewing OCR errors.

SUMMARY

One or more embodiments described herein provide benefits and/or solve one or more of the foregoing or other problems in the art with systems and methods for assisting users in correcting OCR errors. For example, one or more embodiments provide previews of the source image within the machine-readable document. The previews allow a user to correct OCR errors in a machine-readable document without requiring the user to leave the machine-readable document, view a separate user interface, or guess how to correct the OCR error. Thus, the systems and methods of one or more embodiments disclosed herein can allow users to effectively and easily correct OCR errors in a machine-readable document.

In particular, the systems and methods described in one or more embodiments herein provide previews that are inline and contextual to aid a user in correcting OCR errors. For example, as a user edits text within the machine-readable document, the systems and methods disclosed display a preview of the portion of the source image that the user is correcting next to the text the user is correcting. For instance, when the user positions the cursor on a word in the machine-readable document, the systems and methods disclosed herein can display a preview of a portion of the source image corresponding to the word next to the word. In this manner, the user can use the preview of the image when correcting the OCR error in the machine-readable document without needing to switch between user interfaces; thereby reducing or eliminating the chance the user loses their place within the machine-readable document.

Furthermore, in one or more embodiments, the systems and methods described herein provide dynamic image previews. In other words, the systems and methods detect movement of the cursor within the machine-readable document and dynamically update and move the image preview to correspond with movement of the cursor. As such, the system and methods described herein allow a user to navigate within the machine-readable document and correct OCR errors using the image previews without having to find or determine the portion of the original image they are correcting.

Additional features and advantages will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which one of ordinary skill in the art can obtain the above-recited and other advantages and features of the present disclosure, a more particular description of the present disclosure briefly described above will be rendered by reference to specific embodiments thereof that are illustrated in the appended drawings. One will note that the figures are not drawn to scale, and that elements of similar structure or function are generally represented by like reference numerals for illustrative purposes throughout the figures. Understanding that these drawings depict only typical embodiments of the present disclosure and are not therefore considered to be limiting of its scope, the present disclosure will be described and explained with additional specificity and detail through the use of the accompanying drawings in which.

DETAILED DESCRIPTION

Figure 1:
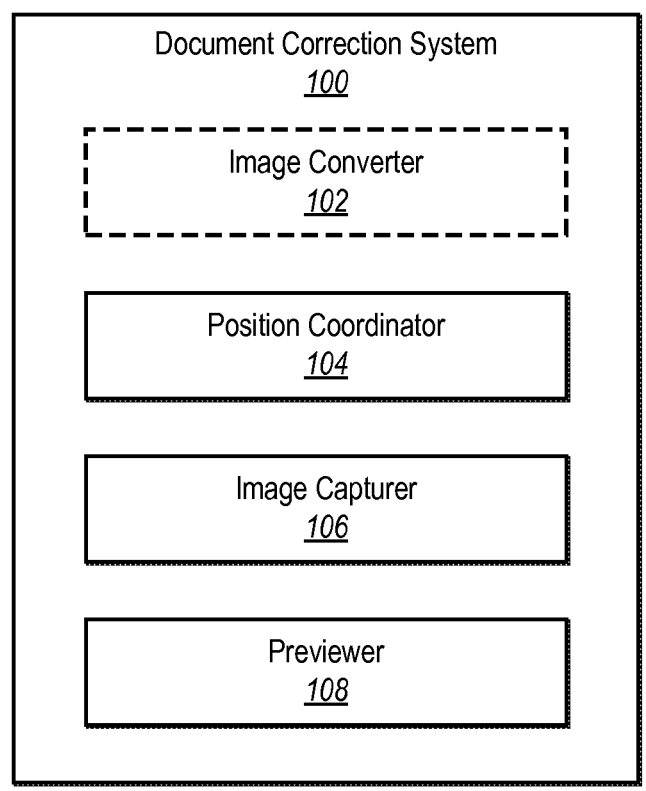
FIG. 1 illustrates a schematic diagram of a document correction system in accordance with one or more embodiments.

One or more embodiments of the present disclosure include a document correction system that assists a user in editing a machine-readable document. To illustrate, the document correction system can provide a machine-readable document to the user. For example, the document correction system can convert an image with recognizable text into a document having machine-readable text. The machine-readable document may include text, such as words, letters, or characters that the document correction system did not properly recognize and/or convert (e.g., OCR errors). The user may identify OCR errors in the machine-readable document and desire to correct them. As the user moves a cursor around the machine-readable document to edit the OCR errors, the document correction system can provide a preview of the source image to the user to assist the user in editing the machine-readable document. In particular, the preview can include a portion of the source image that corresponds to the location in the machine-readable document where the user is performing edits.

More specifically, while correcting OCR errors in the machine-readable document, the user may move the cursor near an incorrect word to correct the word. The document correction system can provide the user with a preview of the word from the source image next to the incorrect word within the machine-readable document (e.g., above or below the cursor). In particular, the document correction system can identify the position of the cursor in the machine-readable document, and using the identified position, the document correction system can locate a corresponding portion of the source image. For example, the document correction system may map the identified position of the cursor to the source image to identify a corresponding position in the source image. To illustrate, when the source image is a bitmap image, the document correction system may identify (e.g., map to) the co-ordinates or pixels within bitmap image that correspond to the co-ordinates of cursor within the machine-readable document.

Further, using the corresponding cursor position (e.g., corresponding position co-ordinates) in the source image, the document correction system can capture a preview of the source image that corresponds to content adjacent to the cursor in the machine-readable document. In other words, the captured portion of the source image (i.e., the preview) corresponds to the location in the machine-readable document where the user is performing edits. Once the document correction system captures the preview of the source image, the document correction system can display the preview of the source image to the user within the machine-readable document. Thus, the document correction system allows a user to use the preview of the source image to quickly and accurately correct an OCR error by viewing, within the machine-readable document, the OCR error and the preview of the source image included the correct text next to each other.

The preview of the source image generally includes only a few words of text. Because the preview of the source image is generally a small portion of the total source image, the document correction system can easily display the preview of the source image to the user within the machine-readable document. For example, the document correction system can display the preview of the source image near the location of the cursor. As such, a user can use the cursor to correct OCR errors with little effort and minimal eye movement. As another advantage, the user can correct OCR errors in the machine-readable document without needing to switch between user interfaces, documents, or losing their place within the machine-readable document.

As mentioned above, the document correction system can provide a preview of the source image to the user based on the position of the cursor within the machine-readable document. In some embodiments, the document correction system can update the preview of the source image as the user corrects, edits, and reviews the machine-readable document. For example, as a user moves the cursor around a machine-readable document, the document correction system may detect when the cursor changes position within the machine-readable document. Based on the detected cursor change, the document correction system can identify and capture an updated preview of the source image corresponding to the new position of the cursor in the machine-readable document. Then, the document correction system can overlay the captured portion of the preview of the source image in the machine-readable document next to the cursor. In this manner, the document correction system can dynamically refresh the preview of the source image in the machine-readable document as the user moves the cursor within the machine-readable document. In other words, as the user moves the cursor within the machine-readable document, the document correction system can provide a live moving snapshot preview of the source image that follows the cursor. As such, the document correction system can continuously provide the user with contextually relevant portions of the source images within the machine-readable document without requiring the user to look outside the machine-readable document.

As described below, the document correction system can create bounding boxes in the machine-readable document. For example, the document correction system can surround a portion of text (e.g., a word, a line of text, a paragraph, or a page) or an image within the machine-readable document. Alternatively, the document correction system can identify bounding boxes in existing documents with machine-readable text.

In one or more embodiments disclosed herein, the document correction system can use the bounding boxes to identify the position of a cursor within a machine-readable document. In particular, the document correction system can identify the position of a cursor within a bounding box in the machine-readable document. Using the position of the cursor in the bounding box, the document correction system can identify corresponding co-ordinates in the source image. After identifying the corresponding position co-ordinates in the source image, the document correction system can determine what amount of the source image to capture and include in the source image preview.

To illustrate, when a user is reviewing or editing a machine-readable document, the document correction system can detect the bounding box within which the cursor is located. In addition, the document correction system can identify the position co-ordinates of the bounding box and/or the cursor within the bounding box. Once the document correction system identifies the position co-ordinates of the bounding box and/or the cursor within the bounding box, the document correction system can use the identified co-ordinates to map and locate corresponding position co-ordinates in the source image.

Further, in one or more embodiments disclosed herein, the document correction system can determine the position of the cursor within a bounding box within the machine-readable document. For example, the document correction system may determine that the cursor is x units over, and y units above a bottom corner of the bounding box in which the cursor is located. The document correction system can use the measurements to determine corresponding position co-ordinates within the source image.

In some embodiments, the document correction system can determine a size of the source image to capture (i.e., a capture box size) for the preview based on the bounding box. For example, the document correction system can detect the size and location of a bounding box. The document correction system can then determine whether to capture the entire bounding box, a portion of the bounding box, or multiple bounding boxes. For instance, if the bounding box is below a minimum threshold size, the document correction system may determine to capture the entire bounding box, and in some cases, portions of adjacent bounding boxes. Alternatively, if the bounding box is above a maximum threshold size, the document correction system may determine to only capture a portion of the bounding box near the corresponding position co-ordinates.

Further, if the document correction system determines that the position of the cursor is near the edge of a bounding box and/or capture box, the document correction system may modify the parameters of the capture box to capture a preview of the source image that includes contextually relevant content. For example, if the cursor is near the left edge of a bounding box, the document correction system may modify the capture box to include additional content located to the right of the cursor position rather than the white space located to the left of the cursor. In this manner, the document correction system can adjust and adapt which content is shown to users within the preview of the source image. By providing relevant contextual content within a preview of the source image, the document correction system can allow a user to better correct, edit, and review text within the machine-readable document.

In some example embodiments, the document correction system can use bounding boxes to determine when not to show a preview of the source image to a user. For example, because a bounding box can surround relevant text and/or graphics found in the source image, the lack of a bounding box in an area of the machine-readable document may signify a lack of content within the source image. For instance, a user may move the cursor over an area of white space within the machine-readable document, such as a page margin or between text and a graphic. Thus, while the user moves the cursor within the area of white space, the document correction system can determine not to display a preview of the source image to the user because the source image does not contain relevant content in the corresponding area. Further, by determining not to display a preview of the source image, the document correction system can reduce the user of processing resources.

As used herein, the term "optical character recognition system" or "OCR system" refers to a system that supports or enables the digitization of printed texts so that a user and/or a computing device can electronically edit, search, store, display, etc. converted text in a machine-readable document. In general, an OCR system converts an image having recognizable text into a converted document that includes machine-readable text. For example, an OCR system recognizes content, such as text, within an original source image having recognizable text and generates a machine-readable document to include machine-readable text corresponding to the content within the image. An example OCR system is ADOBE ACROBAT.

As used herein, the terms "image having recognizable text" and "source image" refer to an image having text within the image that an OCR system has not yet digitized into machine-readable text. The text within the image can include handwritten, typewritten, or printed text. Examples of images having recognizable text can include hardcopies images, printed-paper data records, photographs, invoices, bank statements, flyers, receipts, business cards, mail, or other documents. Further, an OCR system can create a machine-readable document from an image having recognizable text that a computing device stores as a bitmap, portable document file (PDF), or as another file format.

As used herein, the terms "machine-readable document" and "converted document" refer to a document that includes machine-readable text from an image having recognizable text. For example, a user or a computing device can electronically edit, search, store, and/or use machine-readable text in a converted document. The term "machine-readable text," as used herein, refers to text that is in a format that a computing device can identify and modify (e.g., search, copy, edit, move, etc.).

As used herein, the term "bounding box" refers to an area that envelops content. For example, one or more bounding boxes can frame recognized text and/or graphics within the machine-readable document. In one or more embodiments, a bounding box can be square or rectangular. Bounding boxes can be small, such as surrounding a single character, or word. Alternatively, bounding boxes can be large, such as a bounding box encompassing a paragraph of text or a graphic. In some examples, a bounding box can include an entire image having recognizable text. Furthermore, two or more bounding boxes can overlap each other. For example, the edges of two bounding boxes may overlap. As another example, a larger bounding box may include one or more smaller bounding boxes. For example, a paragraph of text may include multiple small bounding boxes that each includes a word within the paragraph as well as a large bounding box that encompasses the entire paragraph. In this example, the smaller bounding boxes may be associated with the larger bounding box, such as in a hierarchical relationship.

As used herein, the term "digital medium environment" refers to an environment that is implemented, for example, as a stand-alone application (e.g., a desktop application or mobile application running on a personal computing device), as a module of an application, as a plug-in for applications including document processing applications, as a library function or functions that may be called by other applications such as document processing applications, and/or as a cloud-computing system. A digital medium environment allows users to modify documents, such as editing machine-readable documents generated from non-machine-readable documents. Example implementations of digital medium environment include, but are not limited to ADOBE ACROBAT and ADOBE READER. "ADOBE," "ADOBE ACROBAT," and "ADOBE READER" are registered trademarks of Adobe Systems Incorporated in the United States and/or other countries.

FIG. 1 illustrates a schematic diagram of a document correction system 100, in accordance with one or more embodiments disclosed herein. As shown, the document correction system may include, but is not limited to an image converter 102, a position coordinator 104, an image capturer 106, and a previewer 108. In some embodiments, however, the document correction system 100 operates without the image converter 102.

Each of the components 102-108 of the document correction system 100 may be in communication with one another using any suitable communication technologies. Although the disclosure herein shows the components 102-108 to be separate in FIG. 1, any of the components 102-108 may be combined into fewer components, such as a single facility or module, or divided into more components as may serve one or more embodiments. In addition, the components 102-108 may be located on, or implemented by, one or more computing devices, such as those described below in relation to FIG. 11.

The components 102-108 can comprise software, hardware, or both. For example, the components 102-108 can comprise one or more instructions stored on a computer readable storage medium and executable by a processor of one or more computing devices (e.g., client devices and/or server devices). When executed by the one or more processors, the computer-executable instructions of the document correction system 100 can cause a computing device(s) to perform the methods described herein. Alternatively, the components 102-108 can comprise hardware, such as a special-purpose processing device to perform a certain function. Additionally or alternatively, the components 102-108 can comprise a combination of computer-executable instructions and hardware.

Furthermore, the components of the document correction system 100 may be implemented in a digital medium environment. For example, the document correction system 100 may be implemented as a stand-alone application, as a module of an application, as a plug-in for applications including document processing applications, as a library function or functions that may be called by other applications such as document processing applications, and/or as a cloud-computing model. Alternatively or additionally, the components of the document correction system 100 may be implemented in any application that allows users to modify documents, such as editing machine-readable documents generated from non-machine-readable documents.

As mentioned above, and as shown in FIG. 1, the document correction system 100 can optionally include an image converter 102. In general, the image convertor 102 facilitates obtaining a source image and converting the source image into a machine-readable document. To illustrate, the image converter 102 can first obtain a source image. For example, the image converter 102 may import a hard copy image, such as by using a scanner or a digital camera. Alternatively, the image converter 102 may receive a digital image, via an electronic message, data link, the Internet, or local digital creation.

In some example embodiments, the image converter 102 can convert a source image into a format that is compatible with the document correction system 100. For example, the image converter 102 may convert the source image into a bitmap image (or simply "bitmap"). A bitmap stores images as rows of pixel, where the rows are stacked on top of each other. As such, a bitmap provides a co-ordinate system that allows the document correction system 100 to identify any position co-ordinates or pixel within the bitmap. Alternatively, the image converter 102 may convert the source image into an alternative image type that similarly allows the document correction system 100 to later identify a position within the source image.

The image converter 102 can identify areas of the machine-readable document to include in one or more bounding boxes. To illustrate, the image converter 102 can identify areas in the machine-readable document that contain content (e.g., text and/or graphics) and surround each identified area, and/or portions of thereof, with one or more bounding boxes. The image converter 102 can also store properties associated with each bounding box. For instance, the image converter 102 can store the identity of each bounding box, such as the name or identification number. The image converter 102 can store the number of words or characters within each bounding box. In addition, the image converter 102 can store the location (e.g., position co-ordinates) and size of each bounding box. Further, the image converter 102 can store relationships, if any, between bounding boxes, such as if a smaller bounding box is linked to a larger encompassing bounding box (e.g., a parent/child or root/leaf relationship).

In some example embodiments, the image converter 102 can recognize text within the source image. For example, the image converter 102 may digitally scan the source image for optically recognizable text. The image converter 102 can then generate machine-readable text using the optically recognized text. In addition, the image converter 102 can recognize fonts, spacing, underlining, and other text formatting in the source image and generate matching machine-readable text to include in a machine-readable document, as described below.

Further, in some example embodiments, as part of recognizing and converting text, the image converter 102 may assign OCR confidence levels to each character and/or word that the image converter 102 converts into machine-readable text. Using the OCR confidence levels, the image converter 102 can identify potential errors (e.g., OCR errors) in a machine-readable document. For example, the image converter 102 can mark characters and/or words that have a low OCR confidence value for user review.

In one or more embodiments, the image converter 102 can facilitate the generation and/or creation of a machine-readable document. For example, the image converter 102 can generate a machine-readable document using the machine-readable text optically recognized from the source image. More specifically, the image converter 102 can generate a machine-readable document having the same look and feel as the source image with the exception that a user can now select, search, and edit the text within the machine-readable document. Besides being machine-readable, the text in the machine-readable document is often more clear and legible to a user because the image converter 102 displays the text in the machine-readable document using system fonts.

Additionally, the document correction system 100 can include a position coordinator 104. In general, the position coordinator 104 can identify the position of an object, such as a pointer or cursor, within the machine-readable document. For example, the position coordinator 104 can use a co-ordinate system to identify the position of a cursor in the machine-readable document. In particular, the position coordinator 104 may identify co-ordinates representing the cursor's position. To illustrate, the position coordinator 104 may identify the cursor as being 30 units down and 20 units over from the top left corner of the machine-readable document.

In some example embodiments, the position coordinator 104 can use the identified position of the cursor in the machine-readable document to locate a corresponding position in the source image (referred to as the "corresponding position co-ordinates"). For example, if the source image is a bitmap having co-ordinate values, the position coordinator 104 can use the co-ordinates of the cursor position in the machine-readable document to locate co-ordinates of the corresponding position co-ordinates in the source image.

In one or more embodiments, the position coordinator 104 can detect when a tracked object changes position within the machine-readable document. For example, the position coordinator 104 may detect a change in the position of a cursor. For instance, as a user moves the cursor within the machine-readable document, such as to edit text or review changes, the position coordinator 104 can track the changing position of the cursor. Upon detecting the cursor changing position, the position coordinator 104 can update the position of the corresponding position co-ordinates in the source image.

In additional embodiments, the position coordinator 104 may not update the position of the corresponding position co-ordinates until the user moves the cursor beyond a threshold distance. For example, as long as a user has the cursor next to the same word, the position coordinator 104 may delay updating the corresponding position co-ordinates. Then, when the user moves the cursor to a new word, the position coordinator 104 may update the corresponding position co-ordinates.

In some example embodiments, the position coordinator 104 may determine when a tracked object approaches a boundary in the machine-readable document. For example, the position coordinator 104 can detect when a user moves a cursor near the edge of the machine-readable document (e.g., near a side margin). As another example, the position coordinator 104 can detect when the cursor is near the edge of a user interface (e.g., a window displaying the machine-readable document). Upon detecting that the cursor is nearing a boundary, the position coordinator 104 can send an indication to the previewer 108 including the position of the cursor as well as details about the nearby boundary, as will be discussed below.

As mentioned above, and as shown in FIG. 1, the document correction system 100 can include an image capturer 106. In general, the image capturer 106 captures a portion of the source image to display to the user. For example, the image capturer 106 may capture a preview of the source image that includes or surrounds the corresponding position co-ordinates. As described below, the image capturer 106 can use a capture box to capture a preview of the source image based on the corresponding position co-ordinates in the source image.

The image capturer 106 may determine the location and size of the preview of the source image using preconfigured settings that specify the size of the capture box. For instance, the image capturer 106 may use a capture box having a fixed length, fixed height, and/or position relative to the corresponding position co-ordinates. To illustrate, the image capturer 106 may aligning the capture box with the co-ordinates of the corresponding position co-ordinates, then capture the contents within the capture box as the preview of the source image.

In an alternative embodiment, the image capturer 106 may improve the relevancy of content in the preview of the source image by dynamically adjusting the location and size of the capture box. The image capturer 106 may adjust the capture box based on a number of factors. For example, the image capturer 106 may adjust the height of the capture box to include any content optically recognized at the corresponding position co-ordinates. As an alternative example, the image capturer 106 may adjust the capture box based on the font size of the content at the corresponding position co-ordinates (e.g., based on the corresponding machine-readable text). In another example, the image capturer 106 may adjust the length of the capture box based on the length of one or more words at the corresponding position co-ordinates. Further, the image capturer 106 may determine whether to center the capture box on the corresponding position co-ordinates or whether to shift the capture box away from a content edge. Additional examples and explanation regarding the image capturer 106 adjusting the size and location of the source image of the capture box are provided in connection with the FIG. 4 below.

Further, the document correction system 100 can include a previewer 108. In general, the image previewer 108 displays the preview of the source image to the user within the machine-readable document. More specifically, the previewer 108 can display the preview of the source image near the cursor. For example, the previewer 108 can provide the preview of the source image just above, below, or to the side of the cursor. In this manner, the previewer 108 can provide a preview to the user that is contextually relevant to the location in the machine-readable document where the user is focusing his or her attention (e.g., the location of the cursor).

In one or more embodiments, the previewer 108 can update the preview of the source image as the user changes the position of the cursor. For example, as the user scrolls the cursor along a line of text, the previewer 108 can refresh the preview of the source image to continually correspond to the position of the cursor. In this manner, the previewer 108 can provide the user with a live moving snapshot of the source image that matches the movement of the cursor.

In some example embodiments, the previewer 108 can determine the location to display the preview of the source image within the machine-readable document. As described above, the position coordinator 104 may send an indication to the previewer 108 indicating that the position of the cursor is near a boundary (e.g., a page or window edge). For example, the previewer 108 can determine whether to display the preview of the source image above or below the cursor, or whether to shift the preview of the source image away from a boundary. In some embodiments, the image capturer 106 and previewer 108 can operate in tandem to capture and display a preview of the source image that is shifted away from a boundary. In this manner, the previewer 108 can prevent the preview of the source image from being cut off by the edge of the user interface window displaying the machine-readable document. Additional examples regarding the previewer 108 adjusting the location of the preview of the source image is described below in connection with FIG. 6.

Figure 2:
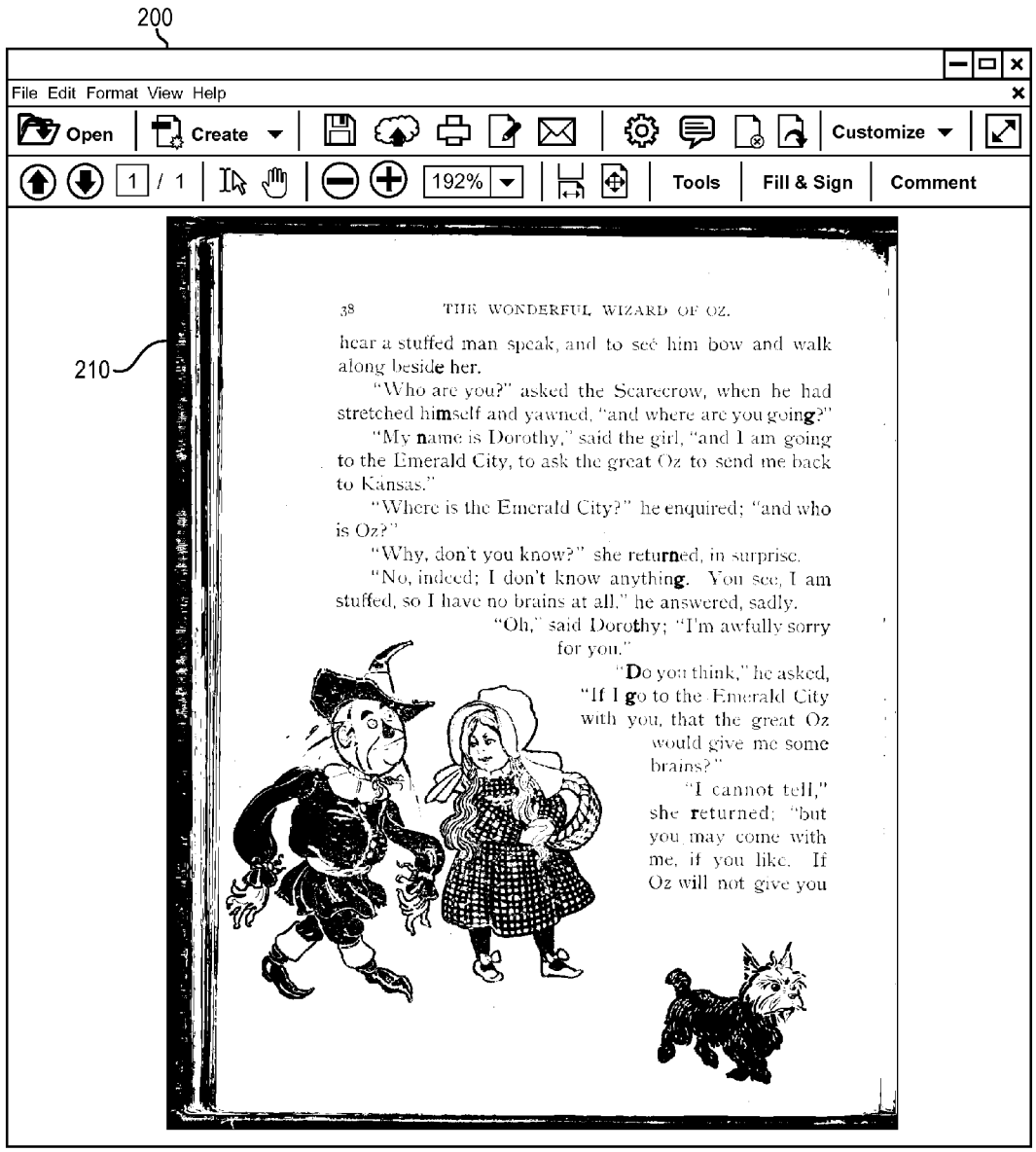
FIG. 2 illustrates an example user interface showing a source image in accordance with one or more embodiments.
Figure 3:
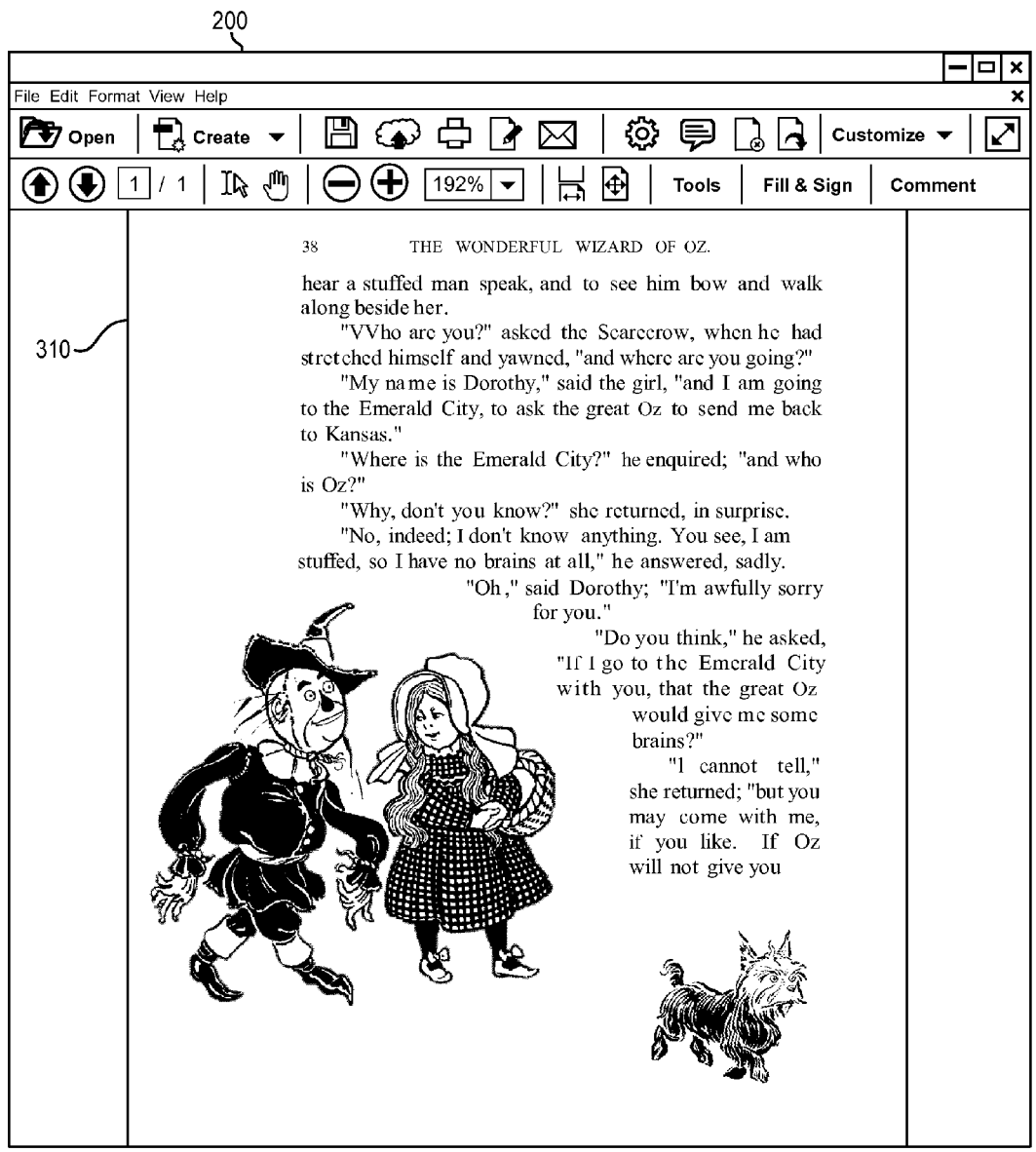
FIG. 3 illustrates an example user interface showing a machine-readable document converted from the source image of FIG. 2 in accordance with one or more embodiments.

FIG. 1 illustrates example components that function within the document correction system 100 according to one or more embodiments disclosed herein. Subsequent figures provide further examples of the document correction system 100 assisting users in correcting, editing, and/or reviewing machine-readable documents for OCR errors. For example, FIG. 2 illustrates an example user interface showing a source image. FIG. 3 illustrates an example user interface showing a machine-readable document converted from the source image of FIG. 2. FIGS. 5-7 illustrate user interfaces showing how the document correction system 100 can assist users by providing contextual relevant preview of the source images to users within a machine-readable document. Other figures provide additional examples of how the document correction system 100 provides preview of the source images to users.

As previously mention, FIG. 2 illustrates an example user interface 200 showing a source image 210. As described above, in some example embodiments, the image converter 102 can obtain a source image. Often, the image converter 102 obtains a source image via user input. For example, a user may scan in a page of a book and provide the scanned image to the image converter 102. Alternatively, the image converter 102 may receive a digital copy of the source image. For instance, a user may download a source image from the Internet or another source.

The source image 210 shown in FIG. 2 includes recognizable text. More specifically, the source image 210 includes content, such as characters, letters, symbols, numbers, words, etc., that a user can read and understand. For example, FIG. 2 shows words from page 38 of *The Wonderful Wizard Of Oz*. As described above, a source image can include text from a variety of sources and locations recognizable to a literate user.

Despite a user being able to read and understand content in the source image 210, a computing device may not be able to read the content in the source image 210 until the source image 210 is converted into machine-readable text. In some example embodiments, the content within a source image may be difficult for a computing device to optically recognize. For example, when a source image has specks, vertical and horizontal lines, content with smears, blurry and/or fuzzy edges, distorted letters, etc., the image converter 102 may have difficulties optically recognizing text within the source image. Other problems that may cause difficulties for the image converter 102 when trying to recognize text include, but are not limited to, skewed content, a low level contrast between the foreground and background, a low resolution image, content that is too light or too dark, uncommon symbols, etc.

When the image converter 102 has difficulties recognizing content, the image converter 102 may introduce errors during the OCR process. For example, the image converter 102 may misinterpret and/or incorrectly recognize characters within a word resulting in the image converter 102 creating machine-readable text that does not match the source image. As another example, the image converter 102 may improperly format words causing a user to see obvious errors in the machine-readable text. In some cases, the image converter 102 may be unable to recognize characters or words, which may result in the image converter 102 not converting the text and a user being unaware that the machine-readable text is incomplete.

In one or more embodiments, a source image may include one or more graphics. For example, the source image 210 in FIG. 2 includes a graphic of scarecrow and a girl in the lower left corner, and a graphic of dog in the bottom right corner. Graphics can include pictures, visual designs, photographs, drawings, line art, graphs, diagrams, typography, numbers, symbols, geometric designs, maps, or other images. Further, graphics can include a range of colors, shapes, and designs. In addition, graphics can provide functional or artistic value to a source image.

Graphics in a source image can be problematic when the image converter 102 tries to convert content from a source image into machine-readable text. For example, when the image converter 102 is recognizing readable content in a source image, graphics can introduce recognition problems and difficulties. To illustrate, when a source image includes words printed over or near a picture, the image converter 102 may have trouble identifying and distinguishing which portion of the source image is text and which portion is the picture.

Further, the image converter 102 may not be able to recognize readable text from a graphic, unless the graphic itself includes recognizable text. The image converter 102, however, can transfer the graphic from a source image to a machine-readable document. In addition, because many graphics do not contain recognizable text, the image converter 102 does not introduce any OCR errors by transferring the graphic into the machine-readable document.

As described above, the image converter 102 may generate a machine-readable document that shares the same look and likeness as the source image on which the machine-readable document is based. To illustrate, FIG. 3 illustrates an example user interface 200 showing a machine-readable document 310 converted from the source image 210 of FIG. 2. The machine-readable document 310 includes the same content (e.g., text and graphics), laid out in the same manner, and formatting using the same styles. As such, the machine-readable document 310 in FIG. 3 appears very similar to the source image 210 in FIG. 2.

While the machine-readable document 310 in FIG. 3 appears similar to the source image 210 in FIG. 2, the machine-readable document 310 may include a number of advantages over the source image 210. For example, the text in a machine-readable document is readable by a computing device. For instance, a computing device can read, process, format, and analyze text that was previously unrecognized. Further, within the machine-readable document, the computing device can allow a user to select, edit, copy, search, add, delete, modify, etc. the converted text.

In some example embodiments, the image converter 102 can replace the recognized text from a source image with system fonts. Using systems fonts allow the image converter 102 to provide a cleaner, crisper look to the text. As such, the content's readability often improves from the source image 210 to the machine-readable document 310. As another advantage, system fonts are readily recognizable by computing devices and allow a user to quickly modify the content within the machine-readable document. In other words, the text in a machine-readable document 310 in FIG. 3 appears to be cleaner and more legible than the text in the source image 210 in FIG. 2.

In some embodiments, the image converter 102 can adjust one or more graphics within the machine-readable document. For example, the image converter 102 can use image-editing software to improve the quality of graphics in the source image before transferring the graphic to the machine-readable document. In this manner, along with improving text quality, the image converter 102 can also improve graphics when generating the machine-readable document. To further illustrate, the graphics of the scarecrow, the girl, and the dog in the machine-readable document 310 appear to be of higher quality than the graphics in the source image 210.

Despite the many advantages of a machine-readable document over a source image, however, the machine-readable document may include OCR errors not present in the original source image. As described above, the image converter 102 may introduce OCR errors based on a number of factors. For example, the image converter 102 may improperly recognize and convert a word from the source image 210 into a different word or as a sting of nonsensical characters. The document correction system 100 disclosed herein, however, can assist users in correcting errors by providing a preview of the source images as described herein.

Upon converting a machine-readable document from a source image, the image convertor 102 may provide the machine-readable document to a user. Alternatively, rather than obtaining and converting a source image into a machine-readable document, the document correction system 100 may receive a machine-readable document in connection with a corresponding source image, as described above. For example, a user may receive a machine-readable document and corresponding source image by receiving the files from a cloud-based computing system.

Figure 4:
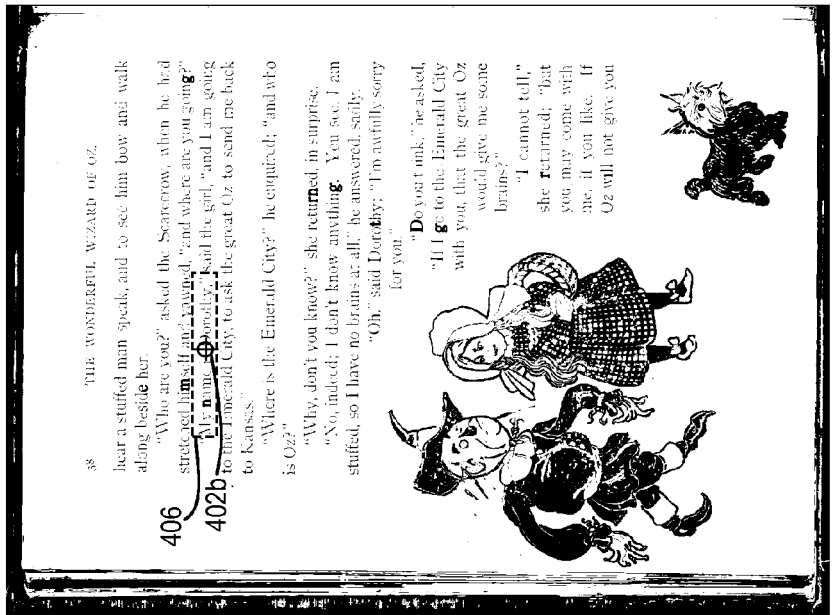
FIG. 4 illustrates a position of a cursor within the machine-readable document of FIG. 3 and a corresponding position within the source image of FIG. 2 in accordance with one or more embodiments.
Figure 4:
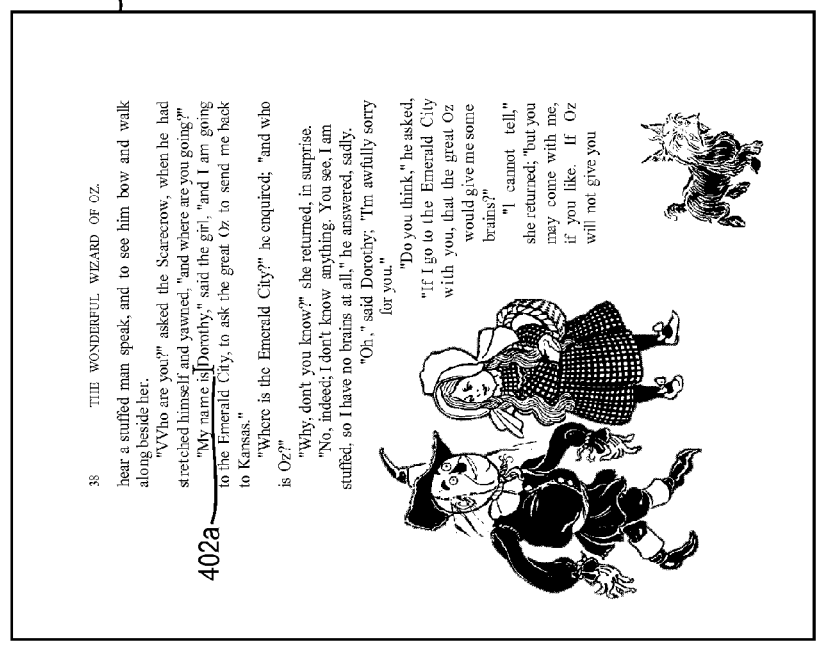

The user may interact with the machine-readable document when correcting, editing, and reviewing the machine-readable document. While interacting with the machine-readable document, the document correction system, and in particular, the position coordinator 104 may identify the position of the cursor within the machine-readable document as well as identify the corresponding position co-ordinates within the source image. Further, the image capturer 106 may capture a preview of the source image based on the co-ordinates of the corresponding position co-ordinates. FIG. 4, described below, provides additional detail regarding the operations of the image coordinator 104 and the image capturer 106.

FIG. 4 shows the machine-readable document 310 and the corresponding source image 210. The machine-readable document 310 may include a cursor 402a that a user may move within the machine-readable document 310. For example, the user can scroll through words in a line of text in the machine-readable document 310 using the cursor 402a. The user can control the cursor 402a using various input devices, such as a mouse, keyboard, track pad, keypad, stylus, touchscreen, retina tracker, voice recognition, etc.

As the user moves the cursor 402a to various locations within the machine-readable document 310, the position coordinator 104 can determine the position of the cursor 402a. In particular, the position coordinator 104 may identify co-ordinates that correspond to the position of the cursor 402a. The co-ordinates may be, for example, Cartesian co-ordinates indicating a point in two-dimensional Euclidean space (e.g., an (x, y) point relative to an x-plane and a y-plane). Alternatively, the co-ordinates may be polar co-ordinates, or orthogonal co-ordinates, vector co-ordinates, pixel co-ordinates, or another type of co-ordinate scheme.

The position coordinator 104 may identify the co-ordinates of the cursor position relative to the machine-readable document 310. For instance, the co-ordinates may identify the cursor position based on the distance and direction of the cursor 402a from a portion of reference in the machine-readable document 310. Alternatively, the position coordinator 104 may determine the number of units the cursor 402a is from another fixed position within the machine-readable document 310, such as a corner, the center of the machine-readable document, or an anchor point.

In additional or alternative embodiments, the position coordinator 104 may determine the position of the cursor using bounding boxes. For example, the position coordinator 104 may identify that the cursor is within a bounding box. To illustrate, the image converter 102 may create a bounding box for each word in the machine-readable document 310. As such, when the cursor 402 is next to a word, the position coordinator 104 may identify the bounding box associated with the word and use the co-ordinates of the bounding box to which the cursor is adjacent.

In alternative embodiments, the position coordinator 104 may identify the specific position of the cursor within the bounding box. In these embodiments, the position coordinator 104 may determine co-ordinates for the cursor with respect to a reference point (e.g., a corner, center, edge) of the bounding box. For example, the position coordinator 104 may identify that the cursor is located a number of units away from a corner of the bounding box.

Using the identified position of the cursor within the machine-readable document 310, the position coordinator 104 may identify corresponding position co-ordinates within the source image 210. In other words, the position coordinator 104 may use the position of the cursor in the machine-readable document 310 to pinpoint the cursor's corresponding location in the source image 210. In particular, the position coordinator 104 can match the content the user is interacting with in the machine-readable document 310, as indicated by the cursor's position, with corresponding content in the source image 210, as indicated by the corresponding position co-ordinates in the source image 210. As an example, the cursor 402a is next to or over the word "Dorothy" in the machine-readable document 310, the position coordinator 104 can use the position of the cursor 402a to identify corresponding position co-ordinates 402b next to or over the word "Dorothy" in the source image 210.

By way of example, the position coordinator 104 may apply the co-ordinate value indicating the cursor's position in the machine-readable document 310 to the source image 210. If the source image 210 and the machine-readable document 310 have a points of origin that are aligned with each other, the position coordinator 104 can use the co-ordinate indicating the position of the cursor 402a in the machine-readable document 310 to identify a co-ordinate pointing to the corresponding position co-ordinates 402b in the source image 210. To illustrate, if the position of the cursor is 10 units across and 4 units down from the origin of the machine-readable document 310 and the cursor is on the word "Dorothy," then by moving 10 units across and 4 units down from the origin of the source image 210, the position coordinator 104 should identify the corresponding position co-ordinates 402b over a image of the word "Dorothy."

As described above, the position coordinator 104 may identify the cursor's position using bounding boxes. Then, using the identified bounding box where the cursor is located, the position coordinator 104 can identify corresponding position co-ordinates in the source image 210. To illustrate, if the cursor 402a is in the bounding box that contains the word "Dorothy" in the machine-readable document 310, the position coordinator 104 can identify the corresponding position co-ordinates in the source image 210.

Further, in embodiments where the position coordinator 104 identifies the position of a cursor with respect to the bounding box, the position coordinator 104 can use the bounding box co-ordinates to identify corresponding position co-ordinates within the source image 210. For example, if the user moves the cursor 402a next to a specific character in the machine-readable document 310, the position coordinator 104 can use co-ordinates of the bounding box co-ordinates identify the corresponding position co-ordinates 402b the source image 210. In this manner, the position coordinator 104 can use a bounding box to identify the corresponding position co-ordinates 402b within the source image 210. In some cases, using bounding box co-ordinates may increase the accuracy of the corresponding position co-ordinates because of the finer granularity a bounding box provides.

Using the corresponding position co-ordinates 402b, the image capturer 106 can capture a preview of the source image that is contextually relevant. To illustrate, when a user moves the cursor 402a within the machine-readable document 310, the position coordinator 104 can identify the corresponding position co-ordinates 402b and capture a preview of the source image based on the position of the corresponding position co-ordinates 402b. More specifically, the image capturer 106 can capture a preview of the source image from the source image 210 that includes content, such as words and text, that matches the content the user is currently editing and/or reviewing within the machine-readable document 310.

In some example embodiments, the image capturer 106 can use a source image capture box to capture content within the source image 210. To illustrate, FIG. 4 shows a source image capture box 406 (or simply capture box) in the source image 210. The image capturer 106 can use the capture box 406 to outline which content to include in a preview of the source image. In other words, the preview of the source image includes content that the image capturer 106 captures within the capture box 406. In some example embodiments, the capture box 406 can be a box. Alternatively, the capture box 406 can be a rectangle, oval, polygon, or other enclosed shape. Thus, while FIG. 4 illustrates a rectangular capture box 406, one will appreciate that the image capturer 106 can use other shapes for the capture box 406.

The parameters of the capture box 406 may determine which content to include in the preview of the source image. The preview of the source image should include content that a user needs in order to correct, edit, and review text within the machine-readable document 310. For example, the preview of the source image can avoid missing relevant content, such as cutting-off letters or portion of words. Further, the preview of the source image can comprise relevant content and avoid irrelevant content, such as showing excess words or white space. Accordingly, the image capturer 106 may dynamically modify the parameters of the capture box 406 to ensure that the preview of the source image fully displays relevant content without displaying irrelevant content. Alternatively, the image capturer 106 may use standard parameters for the capture box 406.

The image capturer 106 can modify the parameters of the capture box 406 based on a number of factors. For example, in one or more embodiments, the image capturer 106 can dynamically modify the parameters of the capture box 406 based on content size. For example, if the corresponding position co-ordinates 402b are next to a particular word within the source image 210, the image capturer 106 may adjust the capture size to capture the entire word as well as adjacent words. To illustrate, the image capturer 106 may optically recognize the height and width of an identified sentence and adjust the size of the capture box 406 to fit the sentence.

In an alternative embodiment, the image capturer 106 may adjust the size of the capture box 406 based on the font size and the number of characters in an identified word. For example, the image capturer 106 may adjust the height of the capture box 406 to be a larger font size than the font side of the identified word. The image capturer 106 can also adjust the width of the capture box 406 to span the identified word. In a similar manner, the image capturer 106 can reduce the size of the capture box 406 to only include the identified word in the preview of the source image and to exclude irrelevant content.

Additionally or alternatively, in some example embodiments, the image capturer 106 may further adjust the size of the capture box 406 to include words adjacent to the identified word. For example, the image capturer 106 may adjust the size of the capture box 406 to include one or more adjacent words in the same line or sentence as an identified word. As another example, the image capturer 106 may adjust the size of the capture box to include multiple errors within a threshold distance of one another, or to include errors within a threshold distance of the position of the cursor. For example, the image capturer 106 may detect two potential OCR errors each within 50 pixels of the cursor position. The capturer 106 may then expand the size of the capture box to include both potential OCR errors. If a user addresses or corrects one of the OCR errors, the capturer 106 may resize the capture box to adjust the capture box based on the single potential OCR error within the threshold distance of the cursor position. In some example embodiments, the user may define the number of adjacent words and/or the width of the capture box 406. For example, the user may use a selectable option or configuration menu to specify the number of words the user prefers to see in the preview of the source image.

In one or more embodiments, the image capturer 106 may modify the size of the capture box 406 based on OCR image information, such as the size of a bounding box. For example, if the cursor 402a is located above a word, line, or paragraph of text that is surrounded by a bounding box within the machine-readable document, the image capturer 106 may determine whether to adjust the capture box 406 to match the size of the bounding box in its entirety, to extend beyond the bounding box, or to capture only a portion of the bounding box. In other words, the image capture 106 can re-use information obtained in the OCR process (e.g., word, line, or paragraph information) to capture a source image preview. To illustrate, if the cursor 402a is over a bounding box that includes a single word or that is smaller that a maximum bounding box threshold, the image capturer 106 may adjust the capture box 406 to match the dimension of the bounding box (e.g., to capture a word, line or paragraph of text).

In some example embodiments, the image capturer 106 may detect that the corresponding position co-ordinates 402*b* are next to or within a word or content that is near a content boundary, such as a side margin or the beginning or end of a paragraph. The image capturer 106 may identify content in a previous or subsequent line to also include in the preview of the source image. For example, the image capturer 106 may use two capture boxes to capture content and append the two boxes together in the preview of the source image. For instance, the image capturer 106 may first request the image converter 102 identify a previous or subsequent piece of content, then request the location of the previous or subsequent piece of content from the position coordinator 104, then additionally capture the previous or subsequent content. Alternatively, the image capturer 106 may use one or more capture boxes to include content from a previous or subsequent content in the preview of the source image. Accordingly, the image capturer 106 can create a preview of the source image that provides relevant content in a proper context even when the original source image 210 has content boundaries between content.

In one or more embodiments, the image capturer 106 can adjust the location of a capture box. In particular, the image capturer 106 may adjust the location of a capture to frame the capture box around relevant content. If the corresponding position co-ordinates are not centered vertically and/or horizontally on a word, the image capturer 106 can adjust the capture box such that the capture box evenly captures the entire word. For example, if the corresponding position co-ordinates are near the bottom on a word, the image capturer 106 can adjust the capture box to include equal spacing above and below the word. In this manner, the image capturer 106 can adjust the location of the capture box to better frame the content before capturing the content.

Further, adjusting the location of the capture box can allow the image capturer 106 to provide relevant content while reducing the amount of irrelevant content in the preview of the source image. To illustrate, if a corresponding position co-ordinates are at or near the beginning of a paragraph, and if the image capturer 106 centers the capture box over the corresponding position co-ordinates, the capture box 406 may extend into the left margin and include a large portion of white space. To prevent the preview of the source image from displaying the excess white space or irrelevant content, the image capturer 106 can bring in the left edge of the capture box 406 to align with the first word in the paragraph. In other words, the image capturer 106 can modify, shirk, or shift the position of the capture box 406 to avoid capturing excess white space in the capture box 406. Accordingly, when the corresponding position co-ordinates are located at or near a content boundary, the image capturer 106 can shift the capture box 406 towards the content and away from white space area before capturing the preview of the source image.

In one or more embodiments, the image capturer 106 can detect when the corresponding position co-ordinates are not located over or near any text or content. For example, the image capturer 106 can detect that the corresponding position co-ordinates are located in a margin, or between a graphic and text. When the image capturer 106 detects that the corresponding position co-ordinates are not near text or content, the image capturer 106 may disable the capture box.

As such, the image capturer 106 may not capture a preview of the source image unless the corresponding position co-ordinates are adjacent to text or content. Similarly, the image capturer 106 may only capture a preview of the source image when the cursor is within a bounding box. Alternatively, the image capturer 106 may capture a preview of the source image regardless of where the cursor is located.

Once the image capturer 106 captures a preview of the source image, the image capturer 106 can provide the preview of the source image to the previewer 108. As described above, the image previewer 108 displays the preview of the source image to the user within the machine-readable document. For example, FIGS. 5A-5C illustrate an example user interface 200 that displays a preview of the source image 506 within a machine-readable document 310.

Figure 5A:
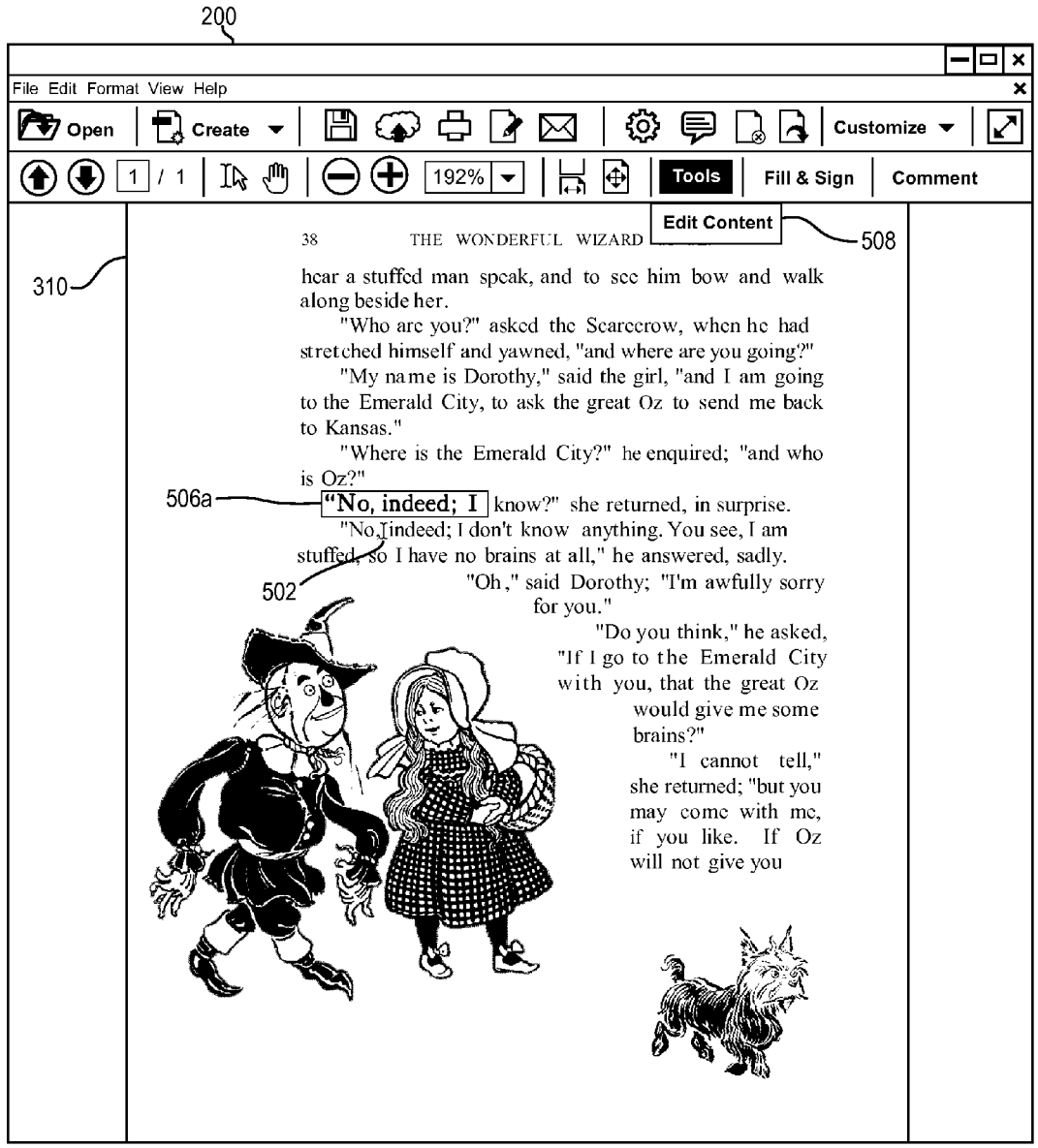
FIGS. 5A-5C illustrate an example user interface that displays preview of the source images within a machine-readable document in accordance with one or more embodiments.
Figure 5B:
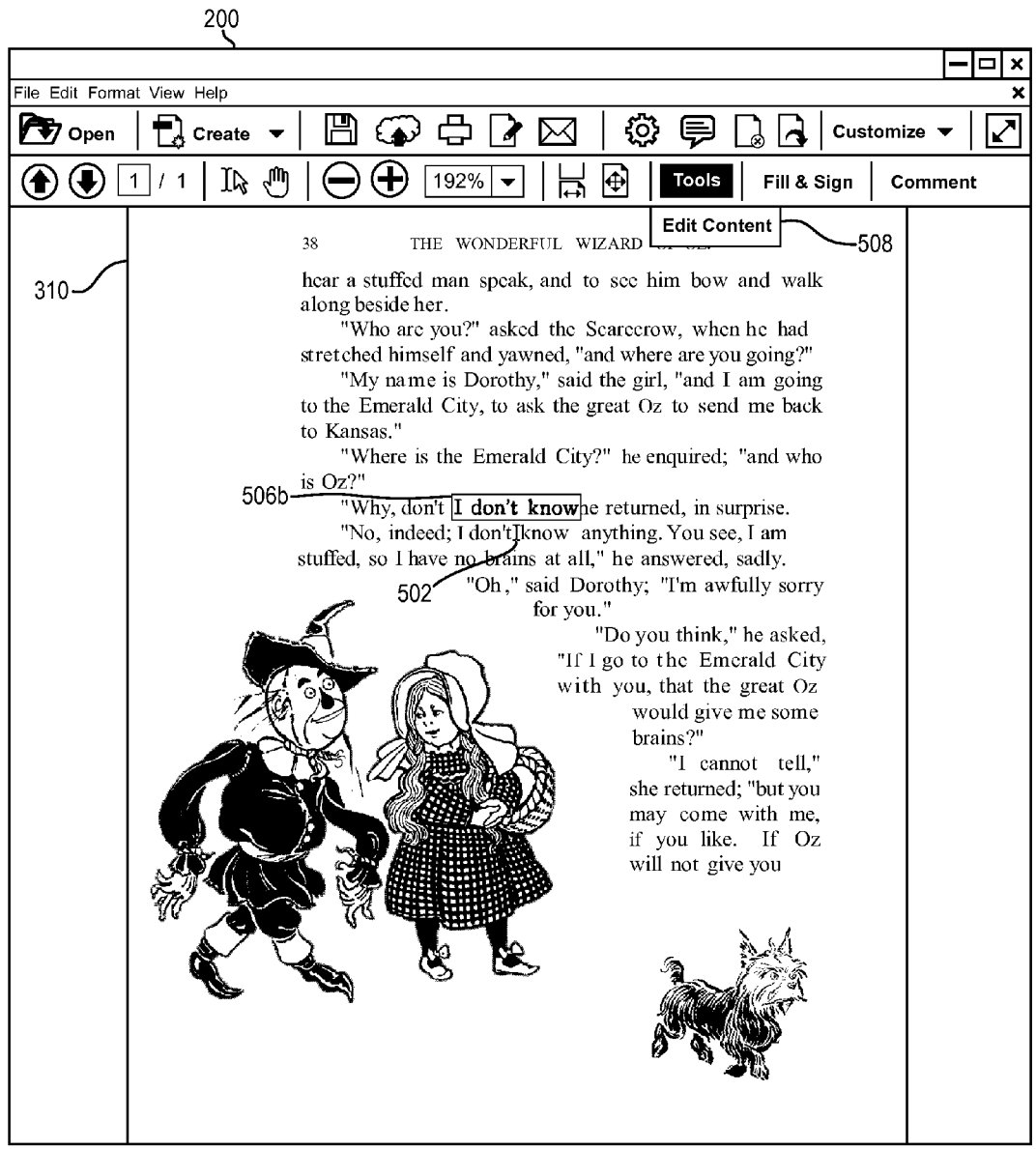
Figure 5C:
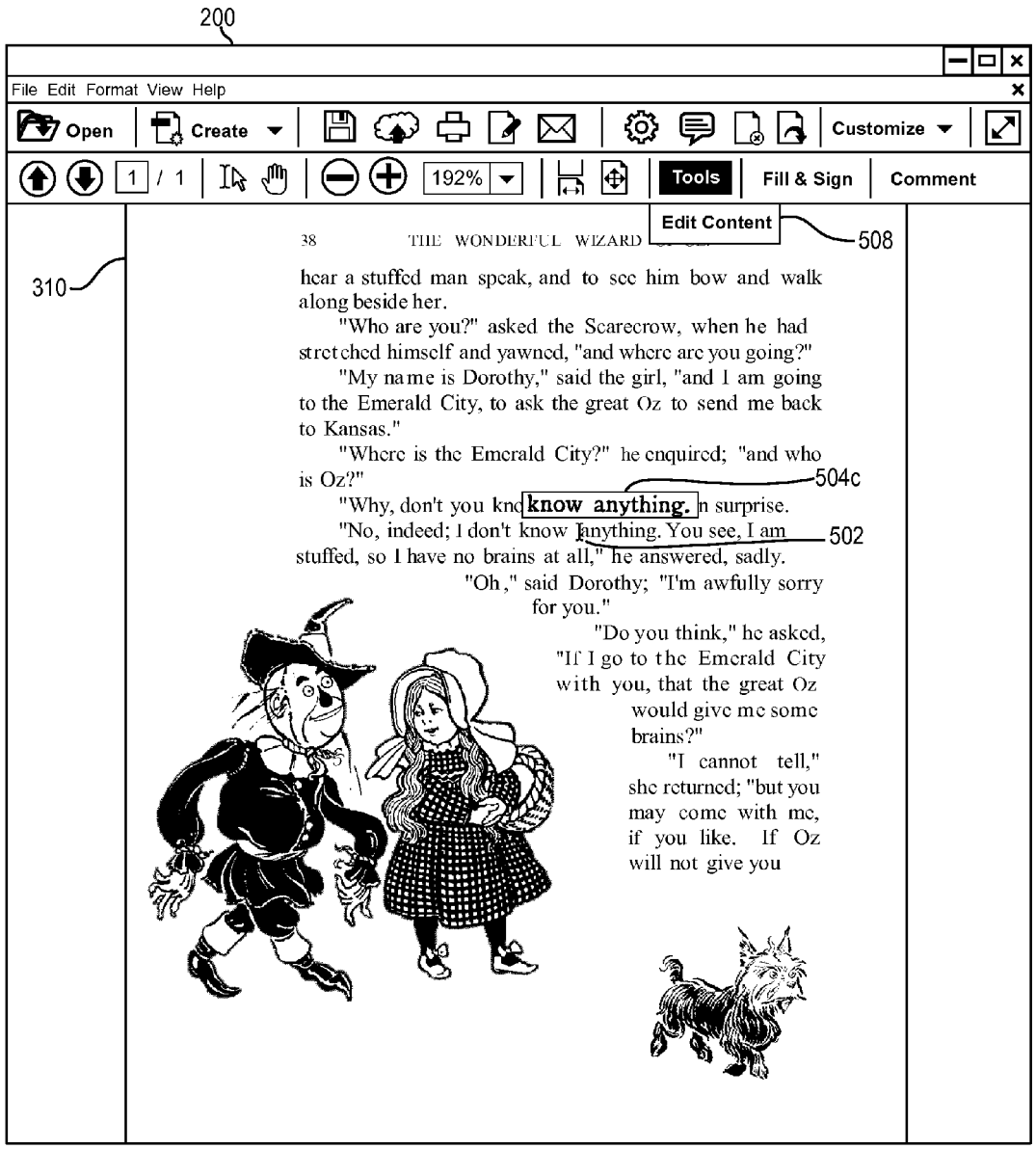
Figure 6:
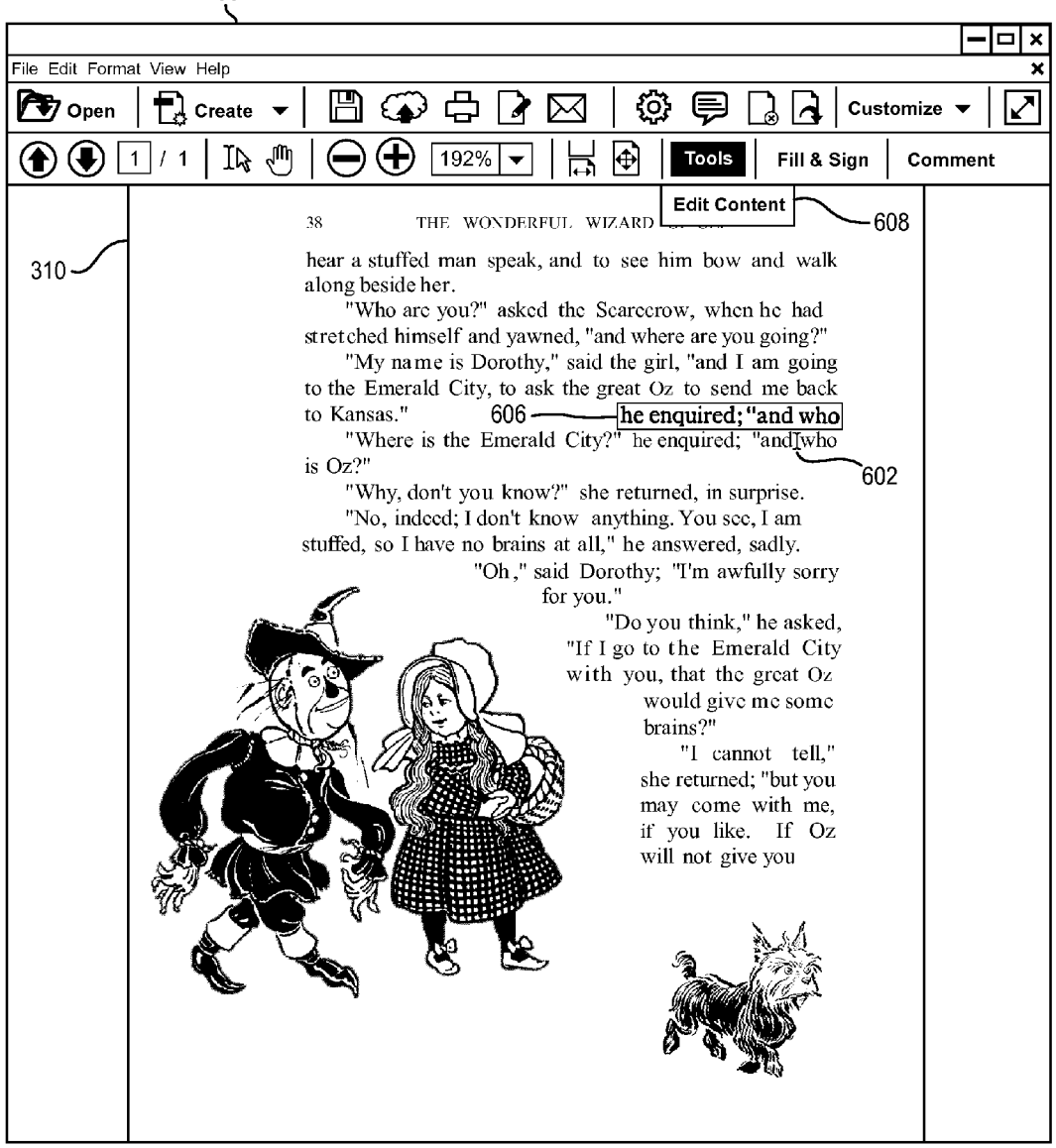
FIG. 6 illustrates another example of a user interface displaying a preview of the source image within a machine-readable document that has been adjusted due to a side border in accordance with one or more embodiments.

In particular, FIG. 5A shows a user interface 200 that include the machine-readable document 310. As described above, the machine-readable document 310 is based on a corresponding source image 210 and includes machine-readable text. The user interface 200 may also include a cursor 502 that allows a user to interact with the machine-readable document 310.

As described above, a user can correct, edit, and review the machine-readable text within the machine-readable document 310. In some example embodiments, the user interface 200 may include, a toolbar, a menu, and/or an option to edit content within the machine-readable document 310. Selecting the editing option 508 can activate the document correction system 100. Alternatively, a computing device may automatically enable the document correction system 100 when the user interacts with the user interface 200.

Upon activation, the document correction system 100 can provide a contextually relevant preview of the source image to a user. More specifically, when the document correction system 100 is active, the previewer 108 can provide a preview of the source image to the user within the machine-readable document based on the position of the cursor. Alternatively, when the document correction system 100 is not active or enabled, the user can move the cursor, but the cursor movement does not result in the previewer 108 displaying a preview of the source image. Further, in some case, when the document correction system 100 is not active, the user is unable to correct or edit content within the machine-readable document 310.

As shown in FIG. 5A, a user may select the editing option 508 from a menu within the toolbar of the user interface 200 to activate or enable the document correction system 100. Further, the user can move the cursor 502 within the machine-readable document 310. As shown, the user moves the cursor 502 between the text, "No, indeed . . . . " In response, the previewer 108 can display the preview 506*a* of the source image to the user proximate to the cursor 502. For example, the previewer 108 displays an image of the words "No, indeed; I" in the preview 506*a* of the source image just above the cursor 502.

As shown by FIG. 5A in one or more embodiments the preview 506*a* of the source image can comprise an image preview box. The image preview box can have a size and shape corresponding to the image capture box described above. Furthermore, the image preview box can include the content of the source image 210 captured within the image capture box. FIG. 5A illustrates that the image preview box is visible (i.e., a line in the shape of a rectangle). In alternative embodiment, the image preview box may not have a visible border.

The previewer 108 may also determine the appropriate location to place the preview of the source image in relation to the cursor. Positioning the preview of the source image near the cursor 502, allows the document correction system to provide the preview of the source image near where the user is focusing his or her attention (e.g., the location of the cursor 502). Further, by positioning the preview 506a of the source image near the cursor 506a, the document correction system 100 can enable a user to edit, correct, and/or review a machine-readable document with minimal eye movement within the user interface 200. To illustrate, the previewer 108 hide content in one or more adjacent rows of text using the preview of the source image (e.g., cover the above row of text when the preview of the source image is above the cursor). As shown in FIG. 5A, the previewer 108 positions the preview 506a of the source image to overlay the row of text above the cursor 502. Further, the previewer 108 may position the preview 506a of the source image such that the preview of the source image does not cover any content in the row of text in which the cursor is located.

In some example embodiments, the previewer 108 can determine where to display the preview 506a of the source image based on the location of the cursor, such as whether to display the preview of the source image above or below the cursor. For example, the previewer 108 can identify the cursor within the user interface 200. Alternatively, the previewer 108 may receive an indication from the position coordinator 104 indicating the position of the cursor. Using the identified position of the cursor, the previewer 108 can determine whether to show the preview of the source image above or below the cursor. To illustrate, if the user moves the cursor 502 to the top line in the machine-readable document 310, the previewer 108 may determine to display the preview 506a of the source image below the cursor 502 because the user interface 200 lacks sufficient room to display preview 506a of the source image above the cursor 502 and below the toolbar at the same time. Additionally or alternatively, in some example embodiments, a user may select a preference as to whether the user prefers displaying the preview of the source image above or below the cursor. For example, the user may use an option-menu (e.g., right-click menu) to change to location of the preview of the source image.

In some example embodiments, the previewer 108 can determine whether to shift the preview 506a of the source image away from a boundary, such as a page or user interface window edge. For example, when a user zooms in on the machine-readable document 310, the user interface 200 may magnify and display a portion of the machine-readable document 310. In response, the previewer 108 may shift the preview 506a of the source image away from the user interface boundary to ensure that the preview 506a of the source image does not get cut off by the boundary.

Further, the previewer 108 may adjust the display location of the preview of the source image based on the orientation, layout, and content of the machine-readable document 310. In some example embodiments, the previewer 108 may display the preview window to the side of the cursor. For example, if the machine-readable document 310 includes columns of text, the previewer 108 may determine to show the preview 506a of the source image to the side of the column where the cursor 502 is located. In another embodiment, when the machine-readable document 310 includes text rotated 90°, the previewer 108 may rotate the preview of the source image to align with the rotated text when the cursor is next to the rotated text.

In one or more embodiments, the previewer 108 can update the preview of the source image as the user changes the position of the cursor. For example, as the user scrolls the cursor along a line of text, the previewer 108 can refresh the preview 506a of the source image to continually correspond to the position of the cursor. To illustrate, FIG. 5B shows the user moving the cursor 502 between the words "don't know." As a result, the previewer 108 updates the preview of the source image 506b to display a portion of the source image that corresponds to the updated cursor location. For example, the preview of the source image displays an image of the words "I don't know" as shown in the source image 210. As a further illustration, in FIG. 5C, the user continues to move the cursor 502c between the words "know anything." Again, the previewer 108 updates the preview of the source image 506c to display an image of the words "know anything" from the source image 210. As illustrated, an updated preview of the source image can overlap content with a previous preview of the source image. In this manner, as the user moves the cursor, the previewer 108 can provide the user with a live moving snapshot preview of the source image.

Thus, the document correction system 100 can detect movement of the cursor 502c within the document with machine-readable text 310. The previewer 108 can dynamically move the image preview box within the document with machine-readable text 310 such that the image preview box stays proximate the cursor 502c. When moving the image preview box, the previewer 108 can dynamically update the portion of the image within the image preview box such that the portion of the image displayed within the image preview box corresponds with the position of the curser 502c as the curser 502c and the image preview box move.

Furthermore, the document correction system 100 can detect a speed and a path of travel of the cursor 502c. The document correction system 100 can then cause the preview 504c of the source image to move at a similar or the same speed along the same path of travel. Thus, the document correction system 100 can cause the preview 504c of the source image to follow or mirror the movement of the cursor 502c.

In some example embodiments, the previewer 108 can identify when the cursor is near the edge of content and whether to shift the preview of the source image. To illustrate, FIG. 6 illustrates a user interface 200 displaying a preview 606 of the source image within a machine-readable document 310. As described above, the preview 606 of the source image corresponds to the position of a cursor 602.

As shown in FIG. 6, a user may move the cursor 602 near a content boundary (e.g., the edge of a line of text). In particular, the user may move the cursor 602 between the words "and who" where "who" is the last word before a new line of text. In response, the previewer 108 can identify that the cursor 602 is near the edge of content (e.g., near the right margin). Accordingly, the previewer 108 can shift the preview 606 of the source image away from the right margin towards the text on the left. To illustrate, the preview 606 of the source image in FIG. 6 displays a preview 606 of the source image that is shifted away from the right margin such that the preview 606 of the source image is no longer centered about the cursor 602.

In some embodiments, the previewer 108, after communicating with the image capturer 106, can determine where to display the preview of the source image within the machine-readable document. As described above, the image capturer 106 can shift the capture box away from a content boundary to capture addition content and less white space within a preview of the source image. The image capturer 106 may provide the preview of the source image to the previewer 108 as well as indicate the shift amount. The previewer 108 can then shift the display of the preview of the source image using indicated shift amount. Content boundaries can comprise margins, illustrations, white space, or other areas that do not include recognized text.

Figure 7A:
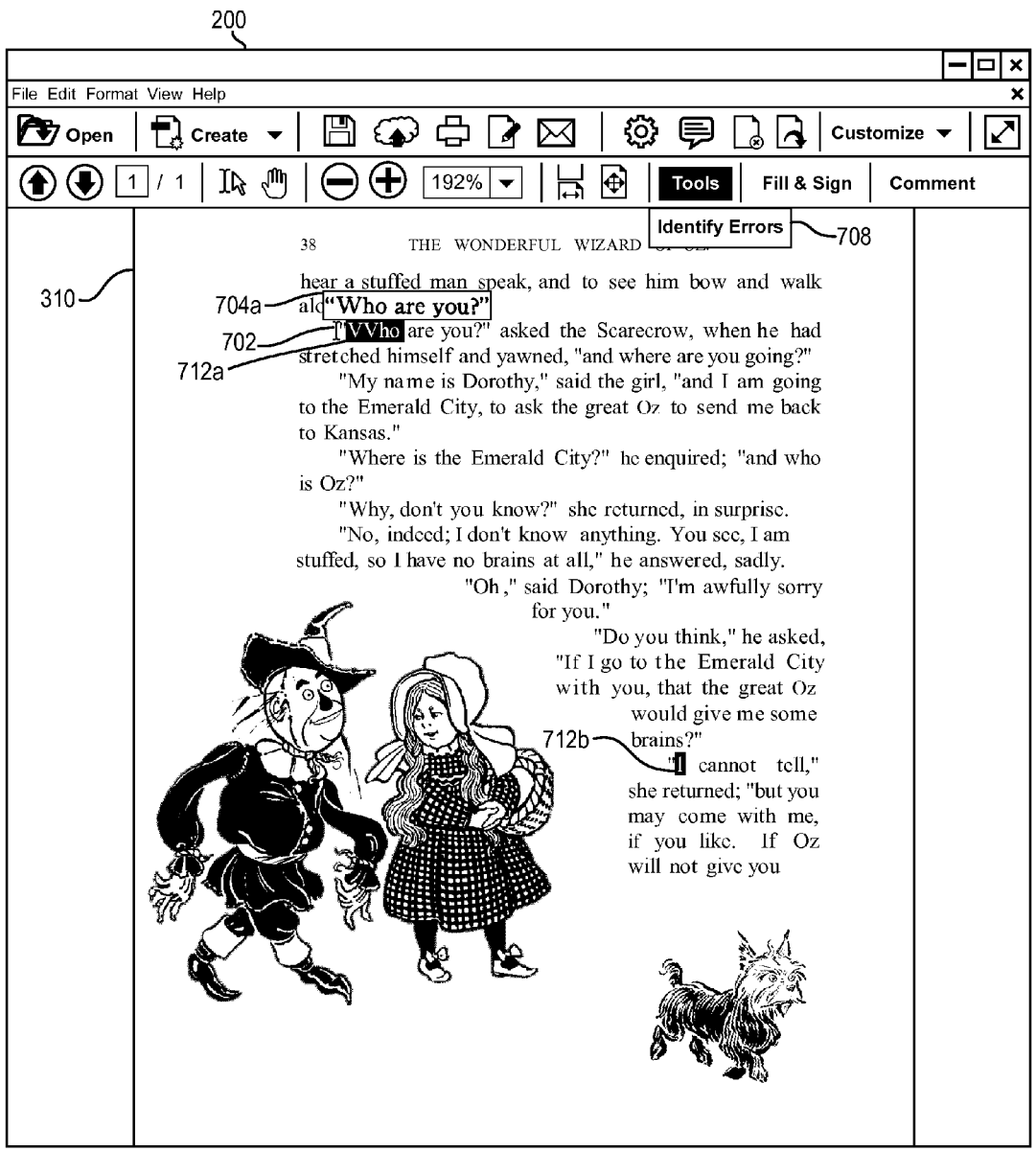
FIGS. 7A-7B illustrate example user interfaces including image previews corresponding to detected potential OCR errors within a machine-readable document in accordance with one or more embodiments.
Figure 7B:
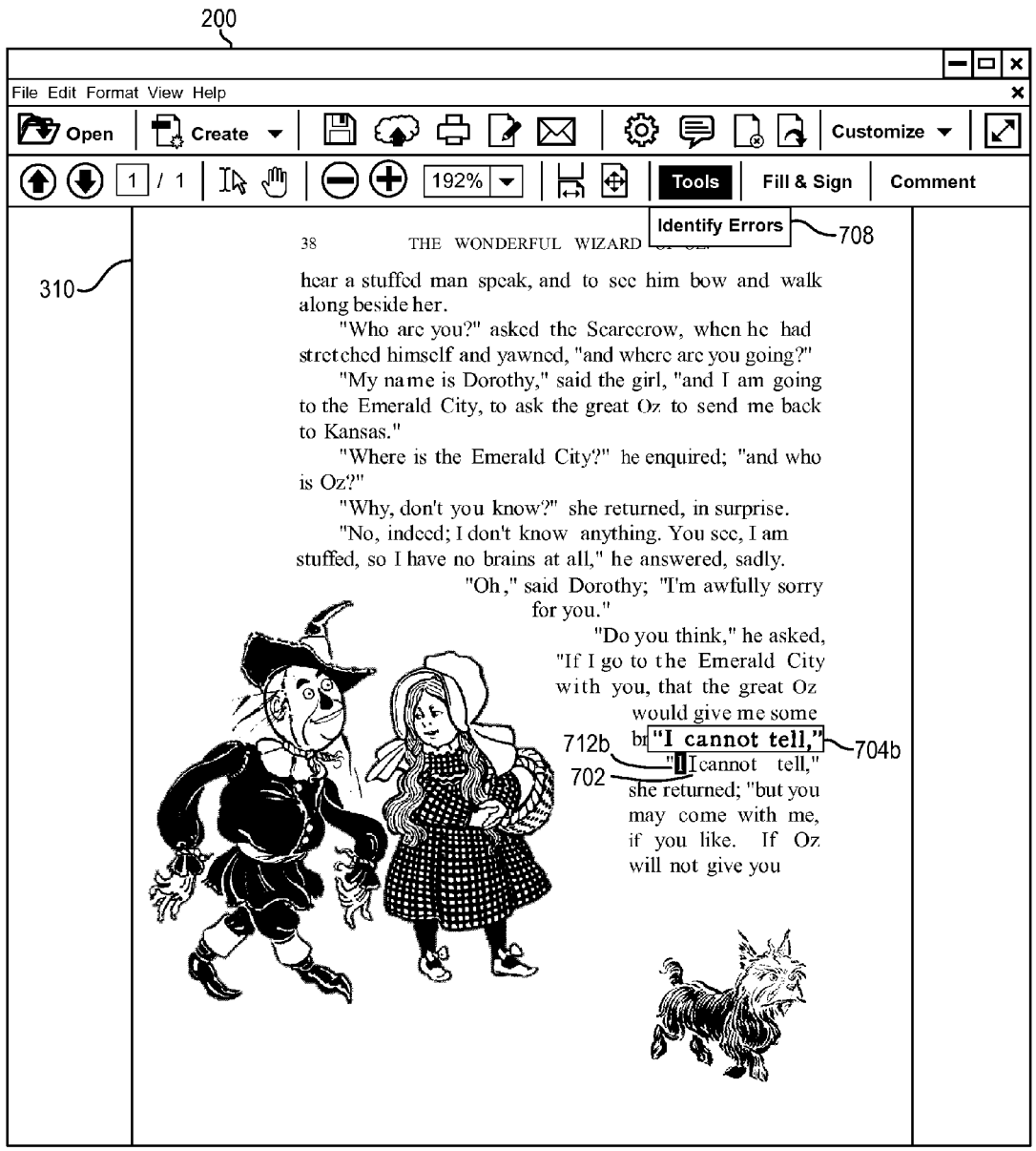

FIGS. 7A-7B illustrate an example user interface 200 that can assist a user in correcting potential OCR errors 712 within a machine-readable document 310. For example, the user interface 200 can include a toolbar having menus and/or selectable options, such as an "Identify Errors" option 708. The user interface 200 can also include a machine-readable document 310. Similar to the description above, the user interface 200 can include a cursor 702 that interacts with the machine-readable document 310, and a preview 704a of the source image that appears within the machine-readable document 310 as the user moves the cursor 702.

In one or more embodiments, a user may select the option to identify errors 708. Upon selecting the option, the document correction system 100 may identify and display potential OCR errors 712 to the user. As shown in FIG. 7A, the document correction system 100 can identify two potential OCR errors 712a-b. For example, the document correction system 100 can highlight or otherwise indicate the potential OCR errors in the machine-readable document 310. The first potential OCR error 712a may include the machine-readable text "VVho" rather than the text "Who." The second potential OCR error 712b may include the number "1" rather than the letter "I."

The user may move the cursor 702 to the first error 712a. For example, the user may move the cursor 702 to the text "VVho." In response, the document correction system 100 can provide a preview 704a of the source image to the user. As shown, the document correction system 100 can show the user the preview 704a of the source image that displays an image of the text "'Who are you'" taken from the source image. The user can view the preview 704a of the source image to correct error.

Once the user corrects the first potential OCR error, the user can then move the cursor 702 to the second potential OCR error 712b, as shown in FIG. 7B. For example, the user can move the cursor 702 to the number "1." In response, the document correction system 100 can provide an updated preview 704b of the source image. As shown, the document correction system 100 can display the preview 704b of the source image that displays an image of the text "'I cannot tell.'" Again, the user can view the preview 704b of the source image and correct the text to "I cannot . . . ." The user can continue to move the cursor 702 within the machine-readable document 310 while using updated preview of the source images 706 as a guide to correct, edit, and/or review potential OCR and other errors.

In some example embodiments, the document correction system 100 can determine a confidence value for each text conversation (e.g., on a character or word level). The document correction system 100 can then identify potential OCR errors based on the confidence values. For example, when a user selects the option 708 to identify potential OCR errors, the document correction system 100 may highlight text having a confidence value below a threshold level as a potential OCR error (712a, 712b). Then, using the preview 704a of the source image, the user can use correct any conversion errors within the machine-readable document 310.

Regardless of whether the document correction system 100 identifies potential errors in the machine-readable document 310, the user can manually correct, edit, and/or review the machine-readable text within the machine-readable document 310. As the user moves the cursor 702, the document correction system 100 can continue to provide a preview 704a of the source image to assist the user in editing the machine-readable document 310.

In some embodiments, a user may use the assistance of the document correction system 100 to correct or note non-OCR errors in a machine-readable document. For example, the user may recognize a grammatical error in the machine-readable document. The user may move the cursor over the error and see that the error is also present in the source image. Even though the document correction system converted the machine-readable text correctly, the user may nonetheless correct the grammatical error in the machine-readable document. Alternatively, the user may add a note (e.g., [sic]) to the machine-readable document indicating that the grammatical error is present in the original source publication.

Figure 8:
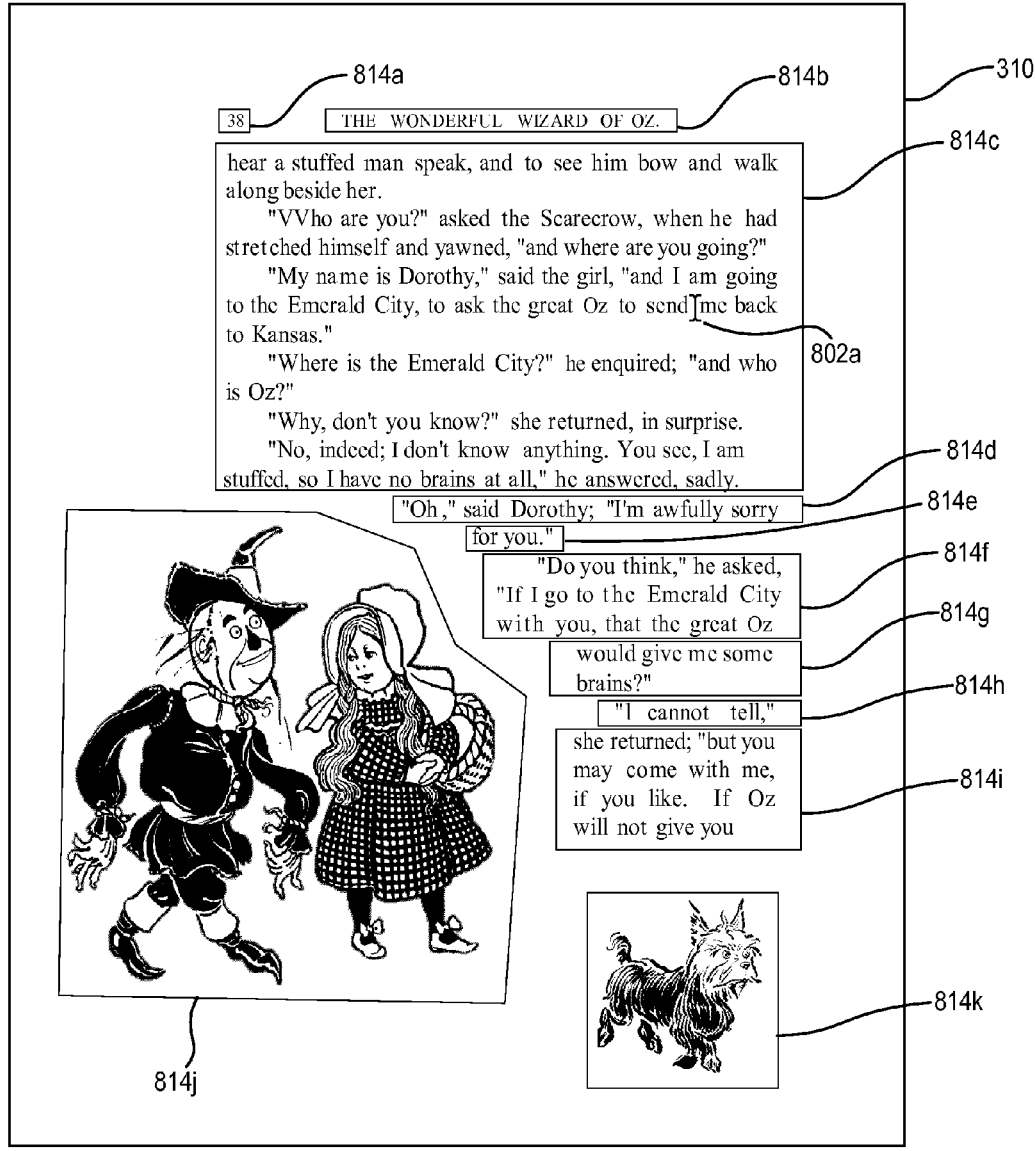
FIG. 8 illustrates bounding boxes within the machine-readable document of FIG. 3 in accordance with one or more embodiments.

FIG. 8 illustrates an example of the document correction system 100 using bounding boxes. For example, FIG. 8 shows a machine-readable document 320 having bounding boxes 814a-k. As described above, in one or more embodiments, the document correction system 100 can identify areas in a machine-readable document that contain content. The document correction system 100 can includes such areas in bounding boxes. As shown in FIG. 8, the document correction system 100 can surround areas having content in the machine-readable document 310 with one or more bounding boxes 814a-k.

In addition, in some example embodiments, the document correction system 100 can use bounding boxes to identify the position of a cursor within a machine-readable document. Similarly, the document correction system 100 can use bounding boxes to identify a corresponding position in the source image. For example, when a user is reviewing or editing a machine-readable document, the document correction system can detect the bounding box within which the user places the cursor. To illustrate, FIG. 8 shows that the cursor 802a next to the words "send me" in the machine-readable document 310. The document correction system 100 can identify that the cursor 802a is in bounding box 814c. The document correction system 100 can then identify and locate the corresponding position co-ordinates in the source image 210, as described above.

Depending on the size of the bounding box, the document correction system 100 may use information associated with a bounding box to capture a preview of the source image that corresponds to the size of one or more bounding boxes in the machine-readable document 310. For example, if the cursor 802a is in bounding box 814g, the document correction system 100 determines that bounding box 814g is below a minimum threshold capture size. As a result, the document correction system 100 may also use information regarding bounding box 814g to capture in the preview of the source image.

In some example embodiments, the document correction system 100 may determine to use information corresponding to multiple bounding boxes to capture a preview of the source image. For instance, when bounding boxes comprise a single word, the document correction system 100 may obtain information from adjacent bounding boxes, or portions thereof, and use the obtained information to capture a preview of the source image. For example, the document correction system 100 may use OCR information from bounding box 814e and OCR information from bounding box 814f to capture the words "sorry" and "for you" in a preview of the source image such that the preview displays "sorry for you."

As described above, in some example embodiments, the document correction system 100 can use bounding boxes to determine whether to show a preview of the source image to a user. For example, if the user moves the cursor 802a outside of the bounding boxes 814, the document correction system 100 may determine not to provide the user with a preview of the source image. Similarly, in some embodiments, when the user moves the curser 802a over graphics without machine-readable text, such as bounding boxes 814j-k, the document correction system 100 may determine not to provide the user with a preview of the source image because the user cannot modify content within these areas. Alternatively, the document correction system 100 can provide a preview of the source image when the user moves the cursor over a graphic even when the user cannot edit the graphic.

Figure 9:
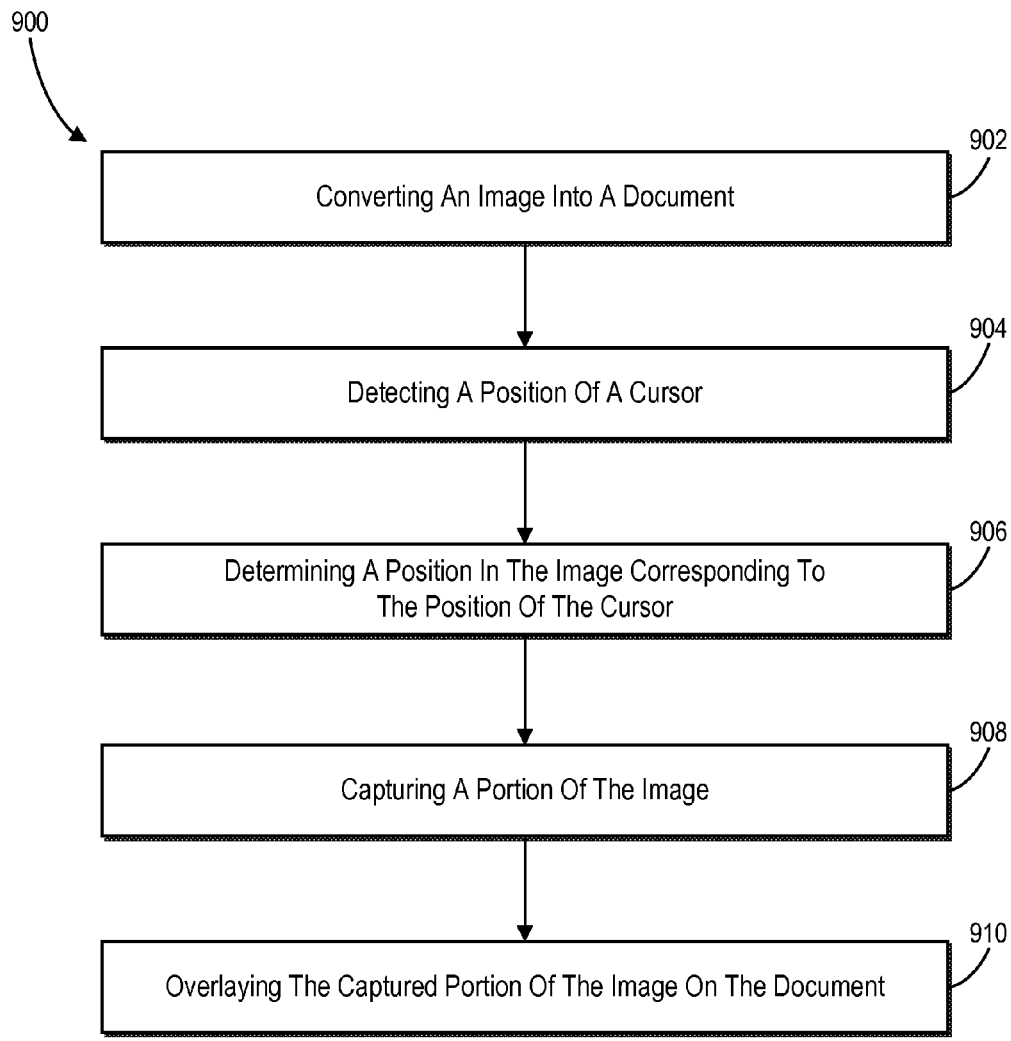
FIG. 9 illustrates a flowchart of a series of acts in a method of aiding a user in correcting OCR errors in accordance with one or more embodiments.
Figure 10:
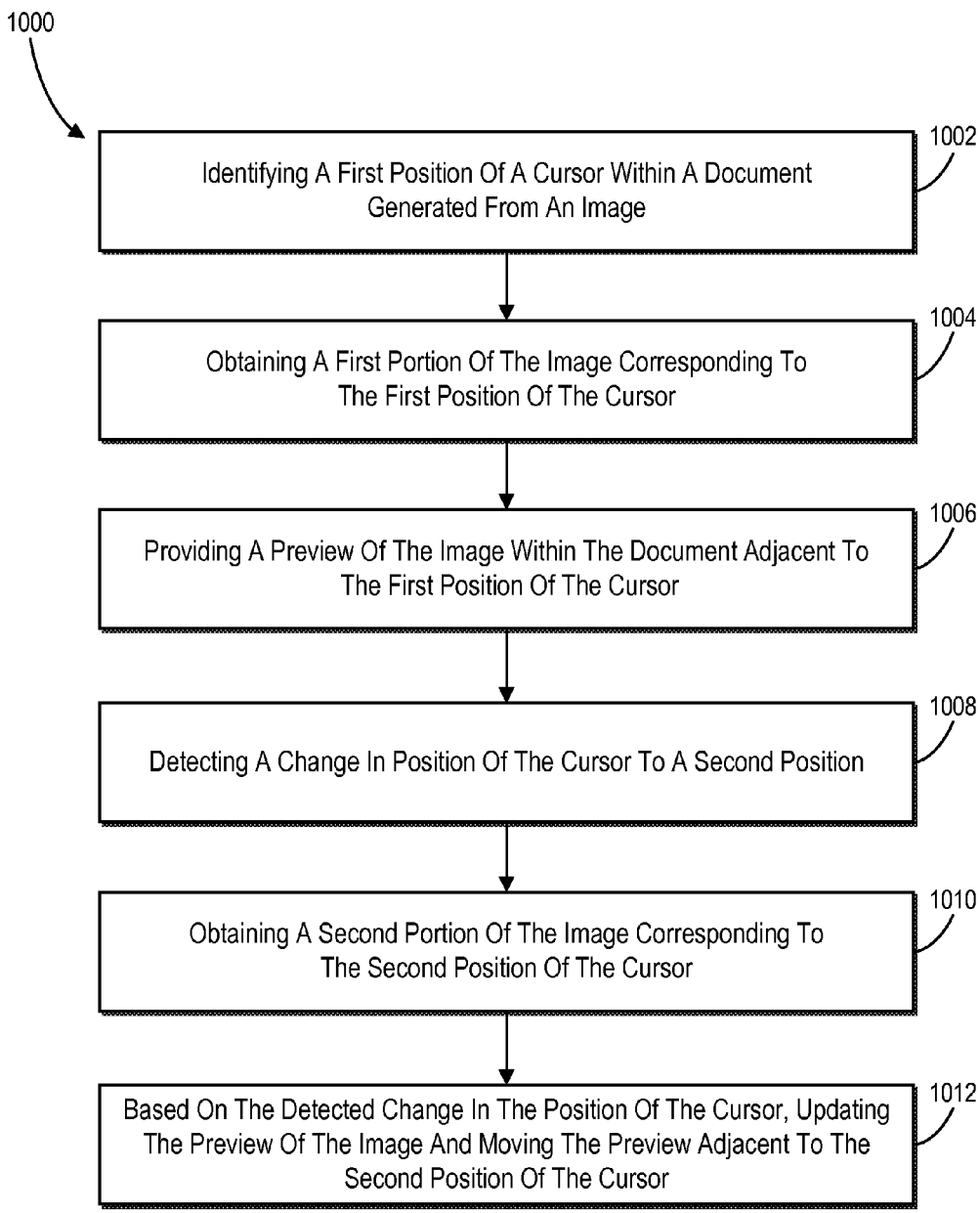
FIG. 10 illustrates a flowchart of a series of acts in a method of providing updated preview of the source images to a user in accordance with one or more embodiments.

FIGS. 1-8, the corresponding text, and the examples, provide a number of different systems and devices for assisting a user in correcting OCR errors. In addition to the foregoing, embodiments can also be described in terms of flowcharts comprising acts and steps in a method for accomplishing a particular result. For example, FIGS. 9 and 10 illustrate flowcharts of exemplary methods in accordance with one or more embodiments of the present invention. The methods described in relation to FIGS. 9 and 10 may be performed with less or more steps/acts or the steps/acts may be performed in differing orders. Additionally, the steps/acts described herein may be repeated or performed in parallel with one another or in parallel with different instances of the same or similar steps/acts.

FIG. 9 illustrates a flowchart of a series of acts in a method of aiding a user in correcting OCR errors. The method may be performed in a digital medium environment for editing machine-readable documents generated from non-machine-readable documents. The method 900 includes an act 902 of converting an image into a document. In particular, the act 902 can involve converting an image having text 210 into a document with machine-readable text 310. In one or more embodiments, converting an image having text into a document with machine-readable text 310 may involve optically recognizing text within a source image 210, converting the optically recognized text into machine-readable text, and generating a document with machine-readable text 310 based on the optically recognizing text.

The method 900 can further include an act 904 of detecting a position of a cursor. In particular, the act 904 can involve detecting a position of a cursor 402a within the document with machine-readable text 310. In one or more embodiments, act 904 can involve identifying co-ordinates of the cursor 402a with respect to the document with machine-readable text 310. Additionally or alternatively, in some example embodiments, act 904 may involve detecting that the cursor 402a is located within a bounding box 814.

Additionally, the method 900 may further include an act 906 of determining a position in the image corresponding to the position of the cursor. In particular, the act 906 can involve determining a position 402b in the image 210 corresponding to the detected position of the cursor 402a within the document with machine-readable text 310. In one or more embodiments, act 906 can involve identifying a cursor position 402b in the image corresponding to the detected position of the cursor 402a within the document with machine-readable text 310 by locating the co-ordinates within the image 210. In some example embodiments, act 906 may involve determining that the position 402b in the image is associated with a bounding box 814 in the document with machine-readable text 310.

Furthermore, the method 900 can include an act 908 of capturing a portion of the image. In particular, the act 908 can involve capturing a portion of the image 406 proximate the position 402b in the image 210 corresponding to the detected position of the cursor 402a within the document with machine-readable text 310. Act 908 can involve capturing, using a source image capture box 406, a portion of the source image 210 based on the corresponding position co-ordinates 402b. Further, act 908 may further involve adjusting the capture box 406 based on the corresponding position co-ordinates 402b within the source image 210. For example, adjusting the capture box 406 may involve adjusting parameters of the capture box 406. Further, in some example embodiments, adjusting the parameters of the image capture box can involve determining that the image capture box overlaps a content boundary and shifting the image capture box away from the boundary.

The method 900 can further include an act 910 of overlaying the captured portion of the image on the document. In particular, the act 910 can involve overlaying the captured portion of the image 506 on the document with machine-readable text 310 adjacent to the detected position of the cursor 402a. Act 910 can involve overlaying or displaying the captured portion of the image 506 above or below the position of the detected position of the cursor 402a. Act 910 can also include adjusting the position of the preview of the source image 506 based on the position of the cursor 402a. For example, when the cursor 402a is near a boundary (e.g., an margin, or a user interface window edge) within the machine-readable document 310, act 910 can shift the preview away from the boundary.

In one or more embodiments, the method 900 may include steps of determining that the detected position of the cursor 402a is near a user interface window boundary and/or shifting the position of the overlaid captured portion 406, 506 of the image 210 away from the user interface window boundary. The method 900 may also include steps of generating one or more bounding boxes 814 in connection with the document having machine-readable text 310 that surround one or more areas of content in the document having machine-readable text 310.

In addition, the method 900 can involve receiving the coordinates of the cursor position as input. For example, as a user moves the cursor, the method 900 can involve receiving the cursor input, moving the cursor location within the document with machine-readable text according to the cursor input, and detecting the coordinates of the position of the newly moved cursor. Further, the method 900 can involve receiving the image portion as another input.

Additionally, as described above, the method 900 can involve determining the location to overlay the captured portion of the image based on the position of the cursor. The method 900 can further involve adjusting the determined location of the overlay of the captured portion to avoid obscuring the cursor or the error within the document with machine-readable text. Similarly, as described above, the method 900 may involve adjusting the determined location of the overlay of the captured portion if the overly is near a boundary, such as a content boundary.

In some example embodiments, the method 900 can involve adjusting the determined location of the overlay of the captured portion to avoid obscuring adjacent potential OCR errors in the document with machine-readable text. For example, if a first potential OCR error is detected above a second OCR error, and a user locates the cursor over the second OCR error, the method 900 may involve positioning the overlay of the captured portion below the second potential OCR error to avoid obscuring the adjacent first OCR error.

In an additional or alternative embodiment, the method 900 may involve extending the captured portion to include nearby potential OCR errors, such as potential errors that are within a threshold distance of each other, or if multiple potential OCR errors are within a specified range of the cursor (e.g., within 30 characters or two words of the cursor). The method 900 may also involve reducing the size of the captured portion when a user corrects potential OCR errors located at a position currently shown in the captured portion. For example, the method 900 may extend the captured portion to include three adjacent potential OCR errors. After a user provides text input to correct one of the potential OCR errors, the method 900 may involve reducing the captured portion to only include the remaining two adjacent potential OCR errors. As another example, when a user is correcting potential OCR errors identified in the document with machine-readable text, the user may be moving the cursor (e.g., horizontally along a line of text). As the position of the cursor changes, the method 900 may involve adjusting the size of the captured portion based on a number of factors, as described above, such as words and characters adjacent to the cursor, the number of potential OCR errors within a threshold distance of the cursor position, if the cursor is approaching or retreating from a boundary area, font characteristics within a threshold distance of the cursor position, etc.

FIG. 10 illustrates a flowchart of an example method 1000 of providing an updated preview of the source images to a user in a machine-readable document. The method 1000 includes an act 1002 of identifying a first position of a cursor within a document generated from an image. In particular, the act 1002 can involve identifying a first position of a cursor 502 within an optical character recognized document 310 generated from an image having recognizable text 210. In one or more embodiments, act 902 can involve detecting co-ordinates corresponding to the position of the cursor 502.

The method 1000 can further include an act 1004 of obtaining a first portion of the image corresponding to the first position of the cursor. In particular, the act 1004 can involve obtaining a first portion 406, 506a of the image having recognizable text 210 corresponding to the first position of the cursor 502 within the optical character recognized document 310. In one or more embodiments, obtaining a first portion can involve positioning an image capture box about the co-ordinates n the image and capturing the portion of the image within the image capture box.

The method 1000 can also include an act 1006 of providing a preview of the image within the document adjacent to the first position of the cursor. In particular, the act 1006 can involve providing a preview of the image 506a, within the optical character recognized document 310 adjacent to the first position of the cursor 502. The preview 506a can include the first portion 406, 506a, of the image having recognizable text 210. In one or more embodiments, providing a preview of the image can involve displaying a preview 506a within the optical character recognized document 310 above or below the position of the first cursor 402a.

Additionally, the method 1000 can include an act 1008 of detecting a change in position of the cursor to a second position. In particular, the act 1008 can involve detecting a change in position of the cursor within the optical character recognized document 310 from the first position 502 to a second position 502. In one or more embodiments, detecting a change in position of the cursor to a second position can involve identifying the position of the second position of the cursor 502 within the optical character recognized document 310. Act 1008 can further involve detecting a co-ordinate value corresponding to the second position of the cursor 502. In some example embodiments, act 1008 can involve detecting a cursor change when the cursor moves beyond a threshold distance.

The method 1000 can further include an act 1010 of obtaining a second portion of the image corresponding to the second position of the cursor. In particular, the act 1004 can involve obtaining a second portion of the image 406, 506b having recognizable text corresponding to the second position of the cursor 502 within the optical character recognized document 310. In one or more embodiments, obtaining a second portion can involve positioning an image capture box about the co-ordinate position in the image and capturing the portion of the image within the image capture box. In some embodiments, the first portion of the image 506a can differ the second portion of the image 506b. In some example embodiments, the first portion of the image 506a can overlap a portion of content with the second portion of the image 506b. Further, act 1010 can involve capturing an updated preview 406, 506b based on the updated identified position in the image 210 corresponding to the second position of the cursor 502.

Based on the detected change in the position of the cursor, the method 1000 can also include an act 1012 of updating the preview of the image and moving the preview adjacent to the second position of the cursor. In particular, based on the detected change in the position of the cursor 502, the act 1012 can involve updating the preview of the image to include the second portion 406, 506b of the image having recognizable text 210. Act 1012 can further involve moving the preview of the image 506b from adjacent the first position 502 to adjacent the second position 502 of the cursor. In one or more embodiments, updating the preview of the image to include the second portion of the image having recognizable text can involve refreshing the preview of the image. Further, moving the preview of the image from adjacent the first position to adjacent the second position of the cursor can involve displaying the preview within the optical character recognized document 310 above or below the position of the second cursor 502.

In particular, act 1012 can involve providing an image preview box containing the preview of the image within the optical character recognized document. Act 1012 can further involve dynamically scrolling the image preview box from the adjacent the first position to adjacent the second position. Act 1012 can also involve dynamically updating the preview of the image within the image preview box while dynamically scrolling the image preview box. In addition to the foregoing, act 1012 can involve detecting a speed of the movement of the cursor and scrolling the image preview box at the detected speed.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
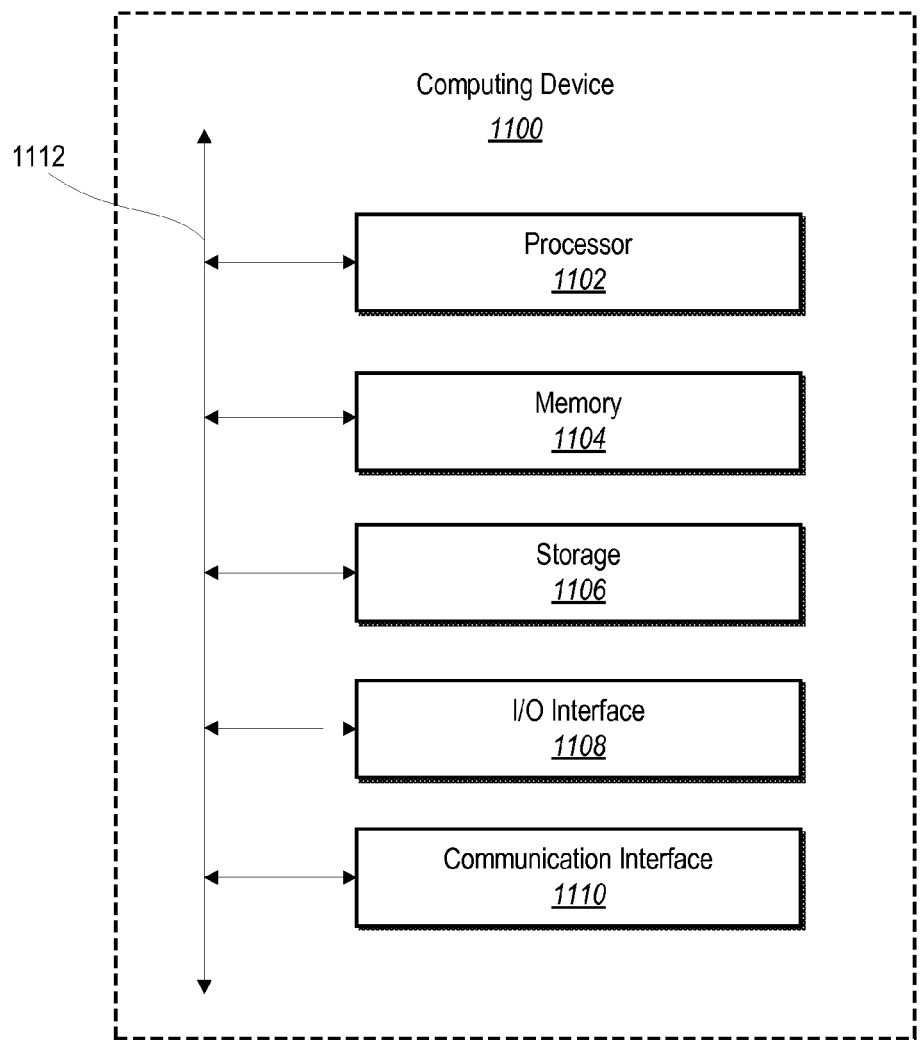
FIG. 11 illustrates a block diagram of an exemplary computing device in accordance with one or more embodiments.

FIG. 11 illustrates a block diagram of exemplary computing device 1100 that may be configured to perform one or more of the processes described above. One will appreciate that one or more computing devices such as the computing device 1100 may implement the document correction system 100. As shown by FIG. 11, the computing device 1100 can comprise a processor 1102, a memory 1104, a storage device 1106, an I/O interface 1108, and a communication interface 1110, which may be communicatively coupled by way of a communication infrastructure 1112. While an exemplary computing device 1100 is shown in FIG. 11, the components illustrated in FIG. 11 are not intended to be limiting. Additional or alternative components may be used in other embodiments. Furthermore, in certain embodiments, the computing device 1100 can include fewer components than those shown in FIG. 11. Components of the computing device 1100 shown in FIG. 11 will now be described in additional detail.

In one or more embodiments, the processor 1102 includes hardware for executing instructions, such as those making up a computer program. As an example and not by way of limitation, to execute instructions, the processor 1102 may retrieve (or fetch) the instructions from an internal register, an internal cache, the memory 1104, or the storage device 1106 and decode and execute them. In one or more embodiments, the processor 1102 may include one or more internal caches for data, instructions, or addresses. As an example and not by way of limitation, the processor 1102 may include one or more instruction caches, one or more data caches, and one or more translation lookaside buffers (TLBs). Instructions in the instruction caches may be copies of instructions in the memory 1104 or the storage 1106.

The memory 1104 may be used for storing data, metadata, and programs for execution by the processor(s). The memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1104 may be internal or distributed memory.

The storage device 1106 includes storage for storing data or instructions. As an example and not by way of limitation, storage device 1106 can comprise a non-transitory storage medium described above. The storage device 1106 may include a hard disk drive (HDD), a floppy disk drive, flash memory, an optical disc, a magneto-optical disc, magnetic tape, or a Universal Serial Bus (USB) drive or a combination of two or more of these. The storage device 1106 may include removable or non-removable (or fixed) media, where appropriate. The storage device 1106 may be internal or external to the computing device 1100. In one or more embodiments, the storage device 1106 is non-volatile, solid-state memory. In other embodiments, the storage device 1106 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 1108 allows a user to provide input to, receive output from, and otherwise transfer data to and receive data from computing device 1100. The I/O interface 1108 may include a mouse, a keypad or a keyboard, a touch screen, a camera, an optical scanner, network interface, modem, other known I/O devices or a combination of such I/O interfaces. The I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1108 is configured to provide graphical data to a display for presentation to a user. The graphical data may be representative of one or more graphical user interfaces and/or any other graphical content as may serve a particular implementation.

The communication interface 1110 can include hardware, software, or both. In any event, the communication interface 1110 can provide one or more interfaces for communication (such as, for example, packet-based communication) between the computing device 1100 and one or more other computing devices or networks. As an example and not by way of limitation, the communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 1110 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 1110 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 1110 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 1112 may include hardware, software, or both that couples components of the computing device 1100 to each other. As an example and not by way of limitation, the communication infrastructure 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present disclosure is, therefore, indicated by the appended claims rather than by the foregoing description. All changes that come within the meaning and range of equivalency of the claims are to be embraced within their scope.

What is claimed is:

1. In a digital medium environment for editing machine-readable documents generated from non-machine-readable documents, a method for aiding in correcting a machine-readable document, comprising:
   converting, by at least one processor, an image having text into a document with machine-readable text;
   detecting, by the at least one processor, a position of a cursor within the document with machine-readable text;
   determining, by the at least one processor, a position in the image corresponding to the detected position of the cursor within the document with machine-readable text;
   capturing, upon determining the position in the image and by the at least one processor, a portion of the image proximate the position in the image corresponding to the detected position of the cursor within the document with machine-readable text; and
   overlaying, by the at least one processor, the captured portion of the image on the document with machine-readable text adjacent to the detected position of the cursor.

2. The method of claim 1, wherein detecting the position of the cursor within the document with machine-readable text comprises identifying co-ordinates of the cursor with respect to the document with machine-readable text.

3. The method of claim 2, wherein determining the position in the image corresponding to the detected position of the cursor within the document with machine-readable text comprises identifying a co-ordinate position in the image.

4. The method of claim 3, wherein capturing the portion of the image proximate the position in the image corresponding to the detected position of the cursor within the document with machine-readable text comprises positioning an image capture box about the co-ordinate position in the image and capturing the portion of the image within the image capture box.

5. The method of claim 4, further comprising adjusting a parameter of the image capture box based on a characteristic of the image proximate to the co-ordinate position in the image.

6. The method of claim 5, wherein adjusting a parameter of the image capture box based on a characteristic of the image proximate to the co-ordinate position in the image comprises:
   determining that the image capture box overlaps a content boundary;
   shifting the image capture box away from the boundary; and
   wherein overlaying the captured portion of the image on the document with machine-readable text comprises overlaying the captured portion of the image on the document with machine-readable text adjacent to the position of the cursor and offset by the content boundary.

7. The method of claim 6, wherein the content boundary is at least one of a side margin, a start of a paragraph, an illustration, or an end of a paragraph.

8. The method of claim 1, further comprising determining that the detected position of the cursor is near a user interface window boundary, and wherein overlaying the captured portion of the image comprises overlaying the captured portion of the image away from the user interface window boundary.

9. The method of claim 1, further comprising generating one or more bounding boxes in connection with the document having machine-readable text that surround one or more areas of content in the document having machine-readable text.

10. The method of claim 9, wherein an area of content comprises a word, a line, a paragraph of text, or an image.

11. The method of claim 1, further comprising:
    identifying one or more potential optical character recognition ("OCR") errors within the document with machine-readable text, the one or more potential OCR errors corresponding to converted text having a confidence value below an OCR error threshold level;
    receiving a cursor input from a user that locates the position of the cursor within the document with machine-readable text over a potential OCR error of the one or more potential OCR errors; and
    wherein detecting the position of the cursor within the document within the machine-readable text comprises determining that the position of the cursor input is over the potential OCR error.

12. The method of claim 11, further comprising:
    receiving, from a user, a selection of an option to edit the document with machine-readable text; and
    wherein identifying the one or more potential OCR errors within the document with machine-readable text, detecting the position of the cursor within the document with machine-readable text, determining the position in the image corresponding to the detected position of the cursor within the document with machine-readable text, capturing the portion of the image proximate the position in the image corresponding to the detected position of the cursor within the document with machine-readable text, overlaying the captured portion of the image on the document with machine-readable text adjacent to the detected position of the cursor are preformed based on receiving the selection of the option to edit the document.

13. The method of claim 12, further comprising:
    receiving, by the user, text input correcting the potential OCR error within the document with machine-readable text, the corrected potential OCR error being located at a position in the document with machine-readable text shown in the captured portion of the image; and
    resizing the captured portion of the image based on the user correcting the potential OCR error.

14. In a digital medium environment for machine-readable documents generated from non-machine-readable documents, a method for aiding in correcting a machine-readable document, comprising:
    identifying, by at least one processor, a first position of a cursor within an optical character recognized document generated from an image having recognizable text;
    obtaining, by the at least one processor, a first portion of the image having recognizable text corresponding to the first position of the cursor within the optical character recognized document;
    providing, by the at least one processor, a preview of the image, within the optical character recognized document adjacent to the first position of the cursor, the preview including the first portion of the image having recognizable text;
    detecting, by the at least one processor, movement of the cursor within the optical character recognized document from the first position to a second position;
    obtaining, by the at least one processor, a second portion of the image having recognizable text corresponding to the second position of the cursor within the optical character recognized document; and
    based on the detected movement in the position of the cursor:

updating, by the at least one processor, the preview of the image to include the second portion of the image having recognizable text; and moving the preview of the image from adjacent the first position to adjacent the second position of the cursor.

15. The method as recited in claim 14, wherein providing, by the at least one processor, the preview of the image, within the optical character recognized document adjacent to the first position of the cursor comprises providing an image preview box containing the preview of the image within the optical character recognized document.

16. The method as recited in claim 15, wherein moving the preview of the image from adjacent the first position to adjacent the second position of the cursor comprises dynamically scrolling the image preview box from the adjacent the first position to adjacent the second position.

17. The method as recited in claim 16, further comprising dynamically updating the preview of the image within the image preview box while dynamically scrolling the image preview box.

18. The method as recited in claim 17, further comprising:
detecting a speed of the movement of the cursor; and
scrolling the image preview box at the detected speed.

19. A system for aiding in correcting a machine-readable document, the system comprising:
at least one processor; and
at least one non-transitory computer readable storage medium storing instructions thereon that, when executed by the at least one processor, cause the system to:
convert an image having text into a document with machine-readable text;
detect a position of a cursor within the document with machine-readable text;
determine a position in the image corresponding to the detected position of the cursor within the document with machine-readable text;
capture, upon determining the position in the image, a portion of the image proximate the position in the image corresponding to the detected position of the cursor within the document with machine-readable text; and
overlay the captured portion of the image on the document with machine-readable text adjacent to the detected position of the cursor.

20. The system as recited in claim 19, further comprising instructions thereon that, when executed by the at least one processor, cause the system to:
provide the captured portion of the image within an image preview box;
detect movement of the cursor within the document with machine-readable text;
dynamically move the image preview box within the document with machine-readable text such that the image preview box stays proximate the cursor; and
dynamically update the portion of the image within the image preview box while moving image preview box within the document with machine-readable text such that the portion of the image displayed within the image preview box corresponds with the position of the curser as the curser and the image preview box move.

* * * * *